(12) United States Patent
Kikuchi

(10) Patent No.: US 7,375,924 B2
(45) Date of Patent: May 20, 2008

(54) RECORDING MEDIUM LOADING DEVICE HAVING ROTATION CAM WHICH DRIVES DOOR OPENING/CLOSING DEVICE

(75) Inventor: Hideo Kikuchi, Tokyo (JP)

(73) Assignee: Alps Electric Co., Ltd., Tokyo (JP)

( * ) Notice: Subject to any disclaimer, the term of this patent is extended or adjusted under 35 U.S.C. 154(b) by 327 days.

(21) Appl. No.: 11/099,112

(22) Filed: Apr. 4, 2005

(65) Prior Publication Data

US 2005/0226606 A1  Oct. 13, 2005

(30) Foreign Application Priority Data

Apr. 9, 2004  (JP) .............................. 2004-115753

(51) Int. Cl.
G11B 33/02 (2006.01)
G11B 17/00 (2006.01)
(52) U.S. Cl. .............................. 360/99.06; 369/75.21; 369/77.21
(58) Field of Classification Search ............... 360/96.5, 360/96.6, 99.02, 99.06, 99.07, 96.51, 96.61; 720/632, 633, 634, 635, 647; 369/75.21, 369/77.21; 242/338.4
See application file for complete search history.

(56) References Cited

U.S. PATENT DOCUMENTS

| | | | |
|---|---|---|---|
| 4,772,970 A | * | 9/1988 | Sato et al. .................. 360/96.5 |
| 5,506,736 A | * | 4/1996 | Ota ............................. 360/96.5 |
| 5,901,130 A | * | 5/1999 | Fukuyama et al. ....... 360/99.06 |
| 2002/0024759 A1 | * | 2/2002 | Sawai et al. ............... 360/96.5 |
| 2002/0024760 A1 | * | 2/2002 | Sawai ........................ 360/96.5 |
| 2002/0071200 A1 | * | 6/2002 | Sawai ........................ 360/96.5 |
| 2002/0093755 A1 | * | 7/2002 | Sawai ........................ 360/96.5 |

FOREIGN PATENT DOCUMENTS

| | | | | |
|---|---|---|---|---|
| JP | 61160749 A | * | 8/1986 | |
| JP | 05314606 A | * | 11/1993 | |
| JP | 2001056987 A | * | 2/2001 | |

* cited by examiner

Primary Examiner—Craig A. Renner
(74) Attorney, Agent, or Firm—Bayer Law Group LLP

(57) ABSTRACT

If a cartridge moves to a complete loading position which is inward of a device by a loading device, a sliding plate moves in Y2 direction in accordance with the loading device. At this moment, because a control convex portion engages a concave portion of a door setting portion by moving from a convex portion of the manipulating member, the manipulating member is pulled by a fourth biasing member and rotates in an $\alpha 2$ direction. Therefore, a control pin moves inside a manipulating groove and sets a door in a closed position. Also, the door is set in the closed position as well even after the cartridge is drawn out of the device.

9 Claims, 14 Drawing Sheets

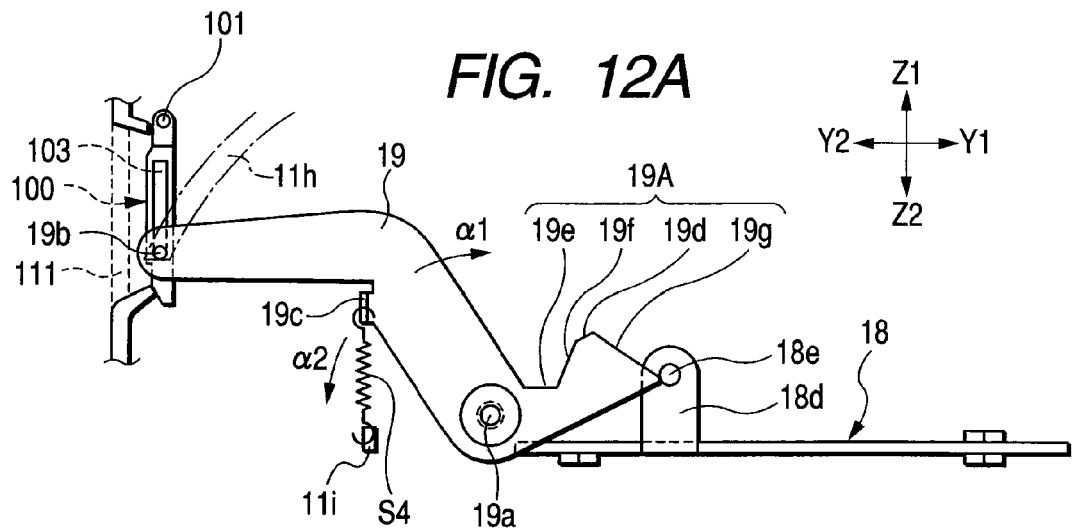
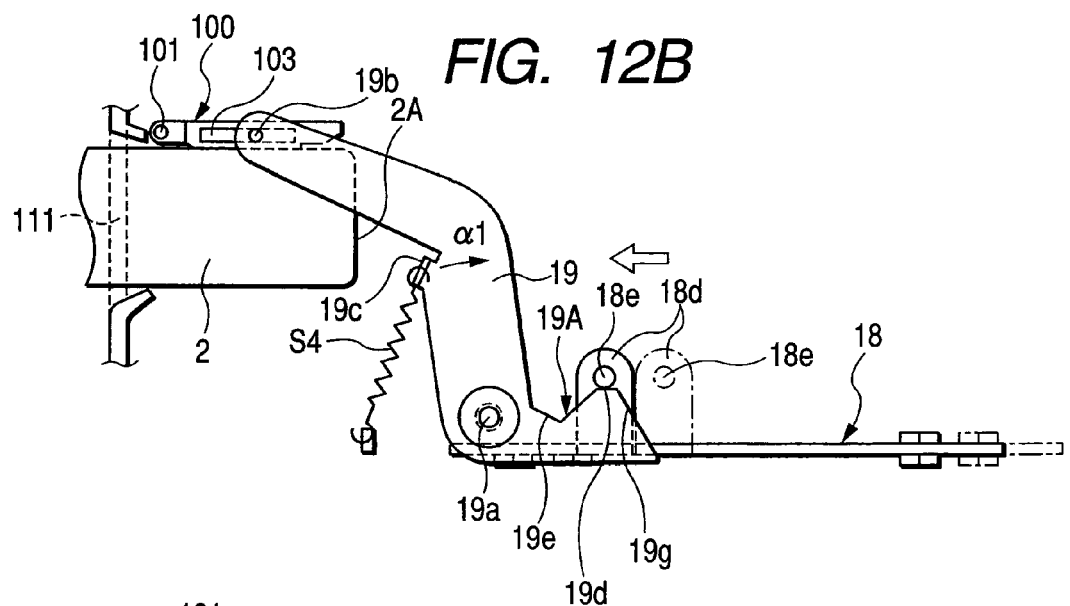
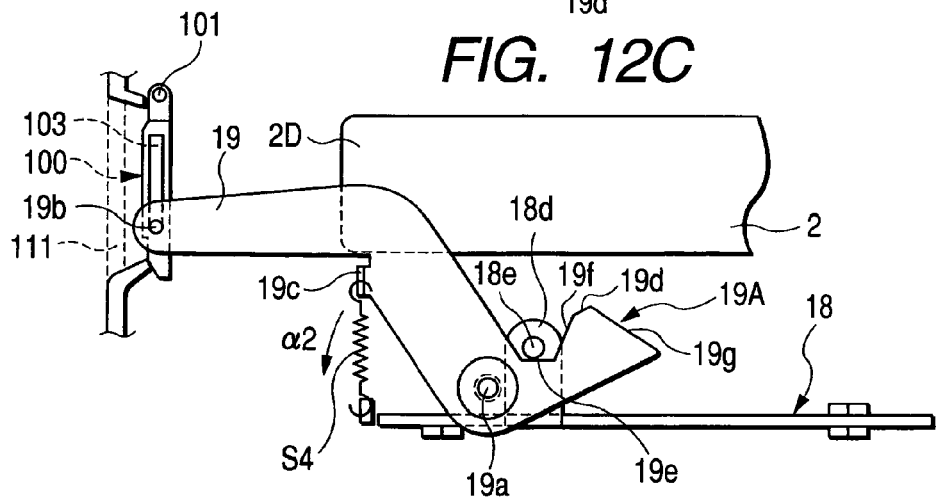

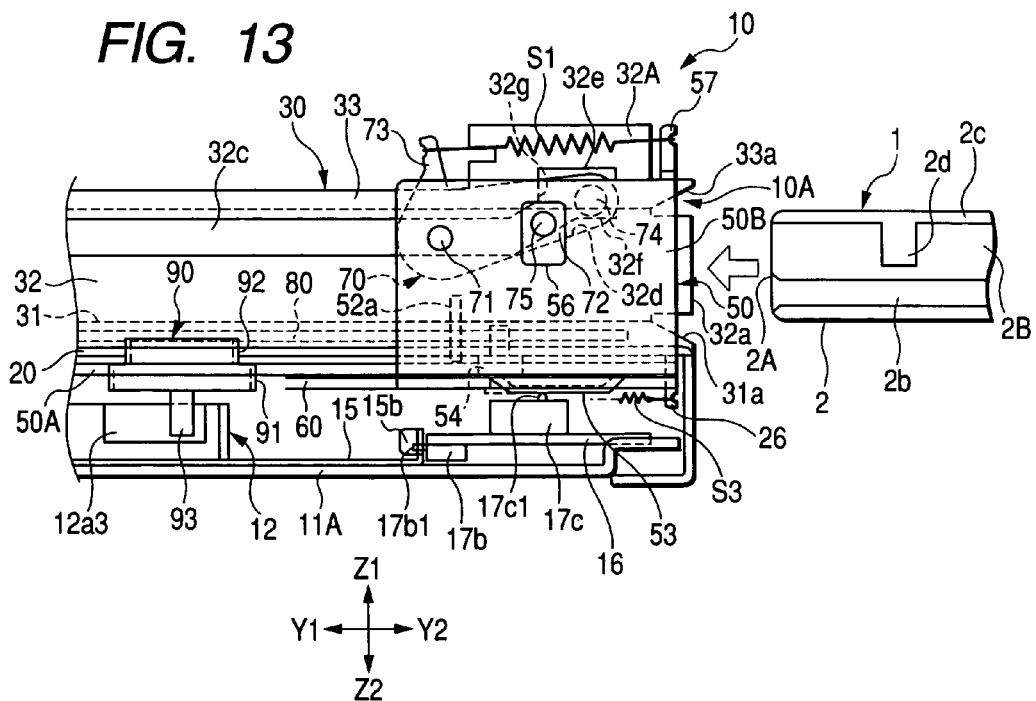
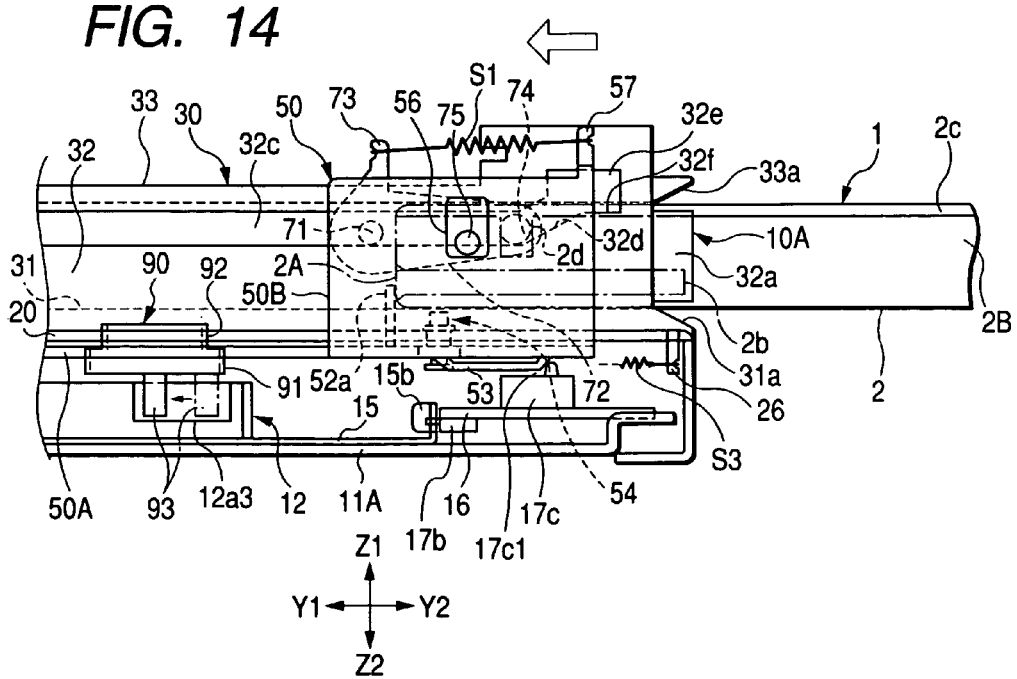

RECORDING MEDIUM LOADING DEVICE HAVING ROTATION CAM WHICH DRIVES DOOR OPENING/CLOSING DEVICE

BACKGROUND OF THE INVENTION

1. Field of the Invention

The present invention relates to a recording medium loading device for loading a recording medium with connectors of a removable hard disk or the like, more particularly to a recording medium loading device including an auto loading device.

2. Description of the Related Art

Recently, with the rapid spread of broadband connection of networks, cost reduction in high performance PCs, and the use of digital still cameras and digital video cameras in every household, information such as video, music and picture data are being digitalized in wide spread scale. Information processing machines such as PCs capable of recording TV programs, television•phones accessible to the Internet are currently going through a new transition surpassing a conventional category including information equipment and electric home appliances.

Recently, in the area of AV devices, a 3.5 inch type fixed hard disk drive is being used as a recording medium for recording a large amount of information, but the technology of the 3.5 inch type fixed hard disk drive has a difficulty in responding to a rapidly increasing need for vast amounts of information.

In this regards, 2.5 inch type and 1.8 inch type removable hard disk drives (RHDD; Removable Hard Disk Drive) have been recently developed by a high-density technology.

In such a removable hard disk drive, a drive device for rotating a disk or a magnetic head for recording and playing back is built therein. Therefore, signals between a removable hard disk and an external device (recording medium loading device) for loading the removable hard disk can be generally carried out via connectors alone.

Therefore, when the removable hard disk is loaded into the recording medium loading device, a connector on the removable hard disk side needs to be connected to a connector on the recording medium loading device side. When the removable hard disk is removed, the connector on the removable hard disk side needs to be disconnected from the connector on the recording medium loading device side. Japanese Unexamined Patent Application Publication NO. 04-47554 is an example of the related art mentioned above.

However, a magnetic recording device disclosed in the Japanese Unexamined Patent Application Publication NO. 04-47554 has problems which will be described as follows.

(1) An ejecting device for ejecting the removable hard disk to outside is incorporated in the Japanese Unexamined Patent Application Publication NO. 04-47554. However, in case that the removable hard disk needs to be inserted, users must manually operate the removable hard disk, which is cumbersome.

(2) The removable hard disk is loaded in the device via an insertion opening formed on the device side. However, when the removable hard disk is taken out, the insertion opening stays open, such that dust and foreign materials get into the device.

(3) A loading device needs to be formed to improve convenience of use, and a door needs to be formed at the insertion opening to prevent dust and foreign particle from entering the device. Here, the two needs are closely related to each other. Thus, the operation of the loading device and the opening and closing operation of the door can be interconnected. However, if the operation of the loading device and the opening and closing operation of the door are interconnected, the device becomes larger, and the assembling process becomes complicated.

SUMMARY OF THE INVENTION

An advantage of the present invention is that it provides a recording medium loading device including a loading device for automatically carrying a recording medium with connectors, a door having a simple construction and capable of performing an opening/closing operation in accordance with an operation of the loading device in order to solve the above-mentioned problems.

A recording medium loading device of the present invention includes an insertion opening to be inserted with a recording medium having formed with connectors, a door formed at the insertion opening to open and close, an opening and closing device for opening and closing the door, an interior connector to which an insertion connector is connected, a loading device for carrying the recording medium in a inserting direction from the insertion opening to a complete loading position where the insertion connecter is connected to the interior connector.

The loading device has a rotation cam which is rotatably formed, the rotation cam being integrally formed with a cam portion which drives the opening and closing device to set a closed position where the door closes the insertion-opening and an open position where the door opens the insertion opening.

According to an aspect of the present invention, the rotation cam is integrally formed with the cam portion constructing the loading device, whereby a recording medium loading device including the door having a simple construction and moving in connection with the operation of the loading device can be provided.

For example, it is configured that the opening and closing device includes a rocking member being operated by the cam portion, a sliding plate moving in response to the rocking movement of the rocking member, a manipulating member rotating in response to the movement of the sliding plate. Here, the door is operated to be opened and closed by the manipulating member.

In the above description, preferably, the cam portion is a cam groove formed annularly in the rotation cam, a closing groove portion for positioning the door in the closed position is formed on opposite ends of the cam groove, and an opening groove portion for positioning the door in the open position is formed on a part except the opposite ends of the cam groove.

In the above construction, the door can be set in the closed position before the recording medium is inserted into the insertion opening and after the recording medium inserted into the insertion opening is transferred to interior of the device, whereby it can be ensured that dust can be prevented from entering the device through the insertion opening. Further, the door can be set in the open position in the process of transferring the recording medium, so that the recording medium can be reliably ejected from the insertion opening, particularly in an ejection operation of the recording medium.

The rocking member includes a control pin capable of being movable inside the cam groove, and the rocking operation is performed by the movement of the control pin between the closing groove and the opening groove.

Also, preferably, a first switch member for detecting an initial rotating position of the rotation cam and a second switch member for detecting a terminated rotating position, and the first switch member and the second switch member are switched by the rocking operation of the rocking member.

In the above construction, the number of parts can be decreased and the construction of the device can be simplified, since the first switch member and the second switch member can be switched by using the rocking member.

The manipulating member is defined with an operation pin, the door is formed with an manipulating groove with the manipulating pin inserted, the control pin moves inside the manipulating groove, when the door is operated to be opened and closed by the rotation of the manipulating member.

In the above construction, the manipulating pin is movable along inside of the manipulating groove formed on a side face of the door. This in turn allows the door to smoothly perform the opening/closing operation during the rotation of the manipulating member.

Also, the manipulating member is defined with a door setting portion including a concave portion and a convex portion, and the sliding plate is formed with a control convex portion for locking the concave portion and the convex portion. The sliding plate moves and locks or unlocks the door setting portion, so that the manipulating member is allowed to be rotated.

In the above construction, the manipulating member can rotate in connection with the movement of the loading device. Thus, this allows the timing of the opening and closing operation of the door to be synchronized with the movement of the loading device. For example, when the recording medium reaches the complete loading position, the door can be set in the closed position. Further, the door is allowed to be set in the open position immediately before the recording medium is ejected.

In the aspect of the present invention, the cam portion may be formed integrally with the rotation cam consisting of a part of the loading device, so that the carrying operation of the loading device and the opening/closing operation of the door can be interconnected without use of complicated interconnecting devices.

Furthermore, the door formed at the insertion opening may be set in the closed position immediately after the recording medium reaches the complete loading position, whereby dust and foreign particles can be effectively prevented from entering into the device through the insertion opening.

Moreover, the switch members are allowed to be switched by use of the rocking member constructing the opening and closing device. This results in decreased number of parts and the simplified construction of the device.

Furthermore, the manipulating pin is movable along inside of the manipulating groove formed on the side face of the door. This in turn allows the door to smoothly perform opening/closing operation during the rotation of the manipulating member.

In addition, rotation of the manipulating member moving in connection with the movement of the loading device allows the timing of the opening and closing operation of the door to be synchronized with the movement of the loading device.

BRIEF DESCRIPTION OF THE DRAWINGS

FIG. 12 is a fragmentary side view showing an operation of the opening and closing device when taken in the same direction of FIG. 4, FIG. 12A shows the initial state corresponding to FIG. 4 and FIG. 8, FIG. 12B shows the carrying state corresponding to FIG. 5 and FIG. 9, and FIG. 12C shows the termination state corresponding to FIG. 6 and FIG. 10;

FIG. 13 is an enlarged side view showing a front portion of the recording medium loading device taken in a direction of an arrow B2 in FIG. 8, in the initial state corresponding to FIG. 4 and FIG. 8;

FIG. 14 is an enlarged side view showing the same portion of FIG. 13 in a state that the recording medium is inserted and engaged with a draw-in member.

DESCRIPTION OF THE PREFERRED EMBODIMENTS

Figure 1:
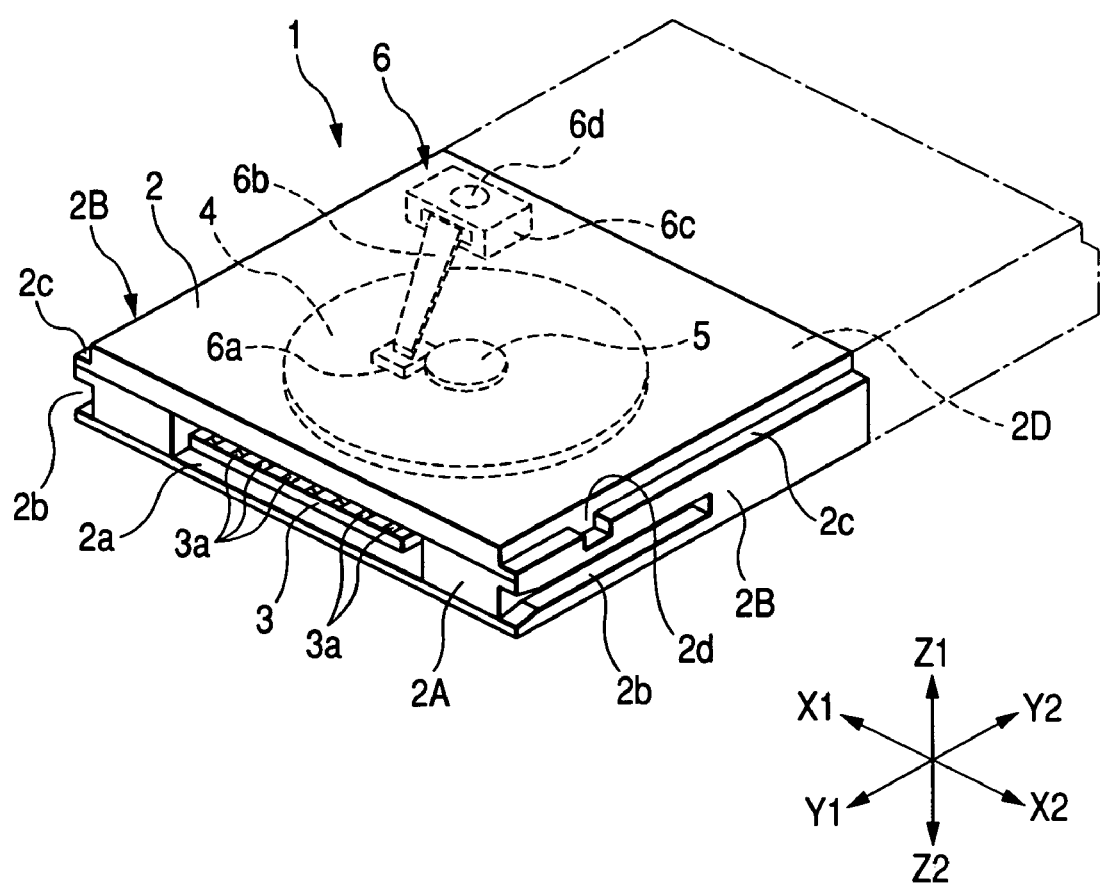
FIG. 1 is a perspective view showing an appearance of a recording medium to be mounted in a recording medium loading device.

First, a recording medium loaded into a recording medium loading device will be described. FIG. 1 is a perspective view showing an appearance of the recording medium to be loaded into the recording medium loading device.

Figure 2:
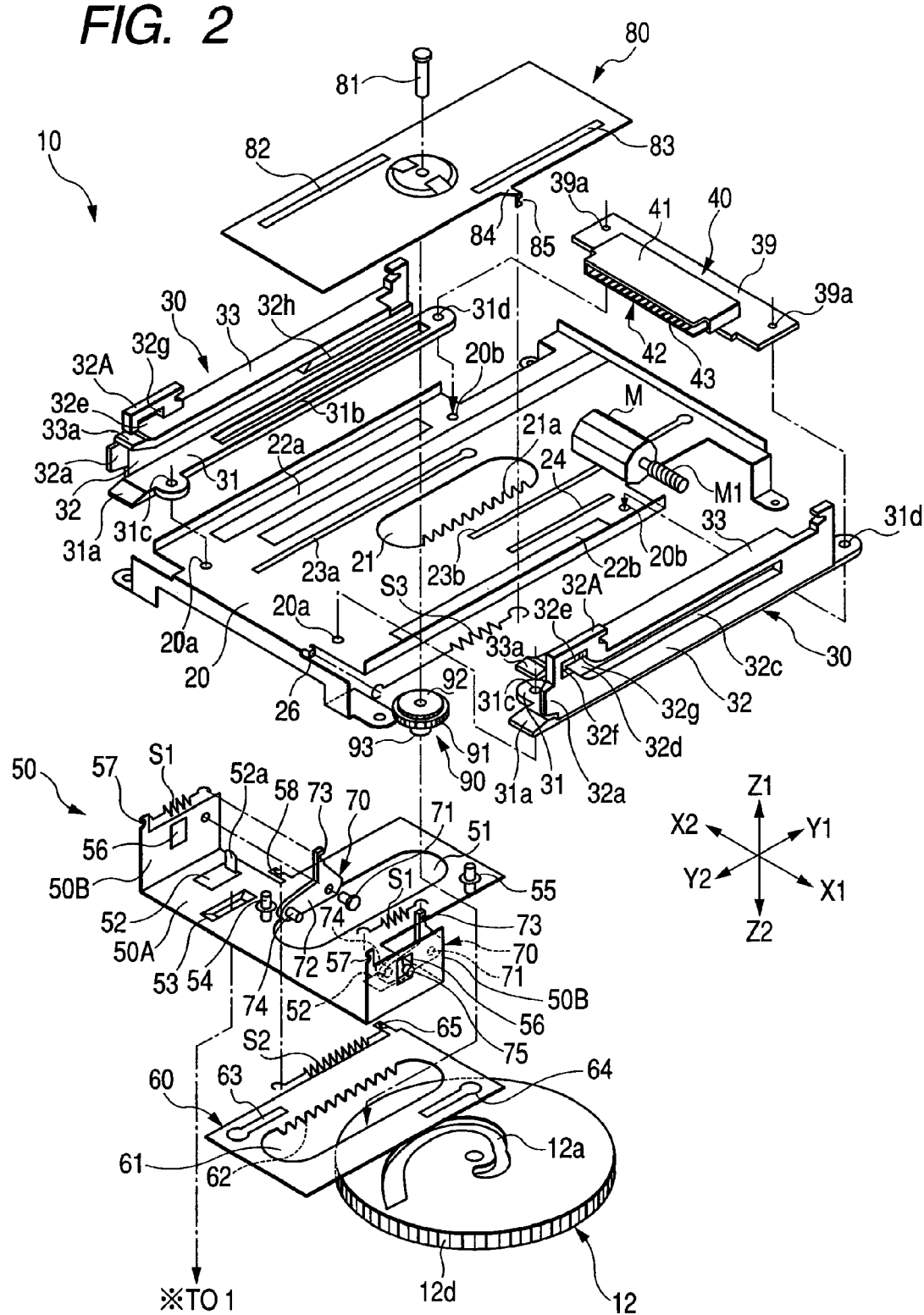
FIG. 2 is an exploded perspective view showing an internal construction of the recording medium loading device according to an embodiment of the present invention.

A recording medium loaded into the recording medium loading device shown in FIG. 2 is, for example, a recording medium 1 as shown in FIG. 1 which is attachable to and detachable from the recording medium loading device. The recording medium 1 has a thin cubic cartridge 2, for example, removable hard disks standardized as 1.8 inch type (small) indicated by a solid line and 2.5 inch type (large) indicated by a dashed line further extended in the Y direction than the solid line. Further, the 1.8 inch type of removable hard disk has, for example, 40 G-byte storage capacity and the 2.5 inch type of removable hard disk has, for example, 80 G-byte storage capacity.

The cartridge 2 is made of, for example, synthetic resin materials. An opening portion 2a is formed at a front face 2A on the Y1 side of the cartridge 2, and an insertion connector 3 for connection is formed in the opening 2a. Guide grooves 2b, 2b extending in the illustrated Y direction are formed in the front portion on the Y1 side of side surfaces 2B, 2B in the X1 and X2 directions of the cartridge 2. Further, step portions 2c, 2c extending in the Y direction are formed above (at the Z1 side) the guide grooves 2b, 2b, and concave portions 2d, 2d serving as locked portions are formed in the step portions 2c, 2c.

As shown in FIG. 1, a magnetic disk 4 and a rotation driving means 5 such as a spindle motor which rotates the magnetic disk 4 are formed in the cartridge 2.

A magnetic head device 6 is built in the cartridge 2. The magnetic head device 6 includes a magnetic head chip 6a which faces a magnetic recording surface of the magnetic disk 4, a load beam 6b which gives a predetermined load on the magnetic head chip 6a, and an access actuator 6c which allows the load beam 6a to rotate about a shaft 6d.

The magnetic head chip 6a is formed with a slider which faces the recording surface of the magnetic disk 4, a reading portion which is mounted in the slider to perform reading by means of magnet resistance effect elements, and a writing portion which performs writing by means of a thin film inductive head. In an operation for recording digital signals to be sent to the recording medium 1 or in an operation for playing back digital signals from the recording medium 1, the magnetic head chip 6a becomes in a slight floating position due to air-bearing on the surface of the magnetic disk 4 which rotates at high speed. Further, the access actuator 6c causes the load beam 6b to perform rocking operation, a sector of the recording surface of the magnetic disk 4 is searched, and the reading portion and the writing portion is tracked to thereby perform a reading operation and a writing operation.

A circuit board is mounted in the cartridge 2, in which a control circuit for driving and controlling the rotation driving means 5, a control circuit for controlling the operation of the magnetic head device 6, a digital signal processing circuit for formatting writing signals and then deformating reading signals, and an interface portion are arranged.

The insertion connector 3 shown in this embodiment is, for example, a slot-in type connector in which a plurality of conductive portions 3a extending in the Y direction are arranged at a predetermined interval in the X direction on a front surface of the board.

Exceptionally, the insertion connector 3 may be formed by a plurality of connecting pins.

Next, the recording medium loading device of the present invention will be described.

Figure 3:
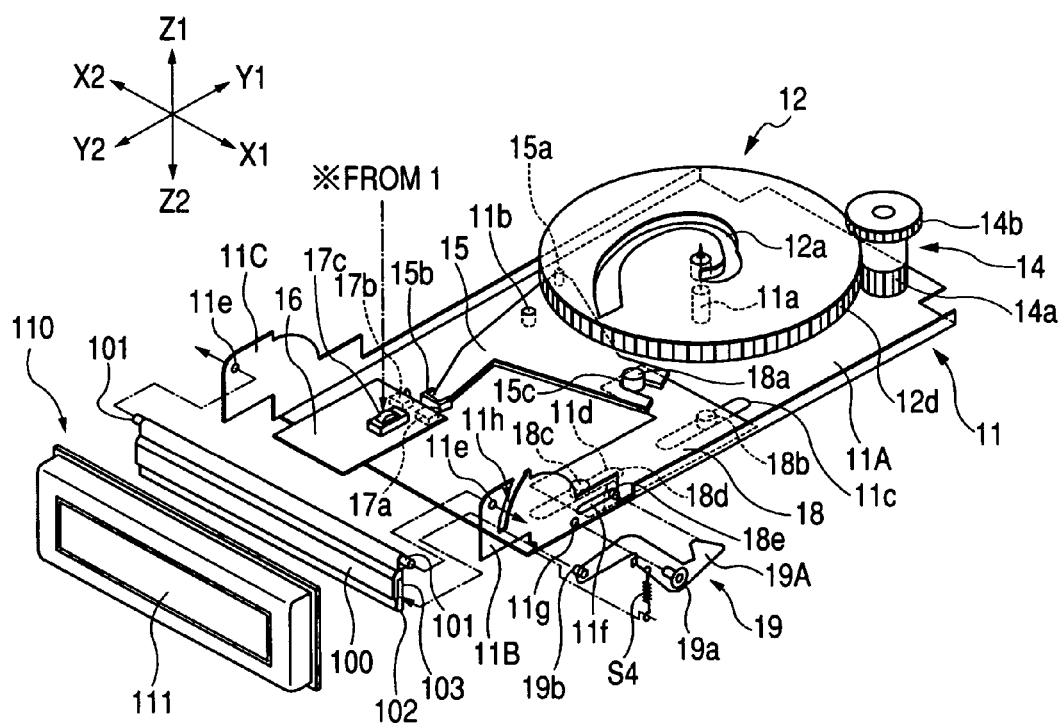
FIG. 3 is an exploded perspective view showing a construction of a lower chassis and a door device.
Figure 4:
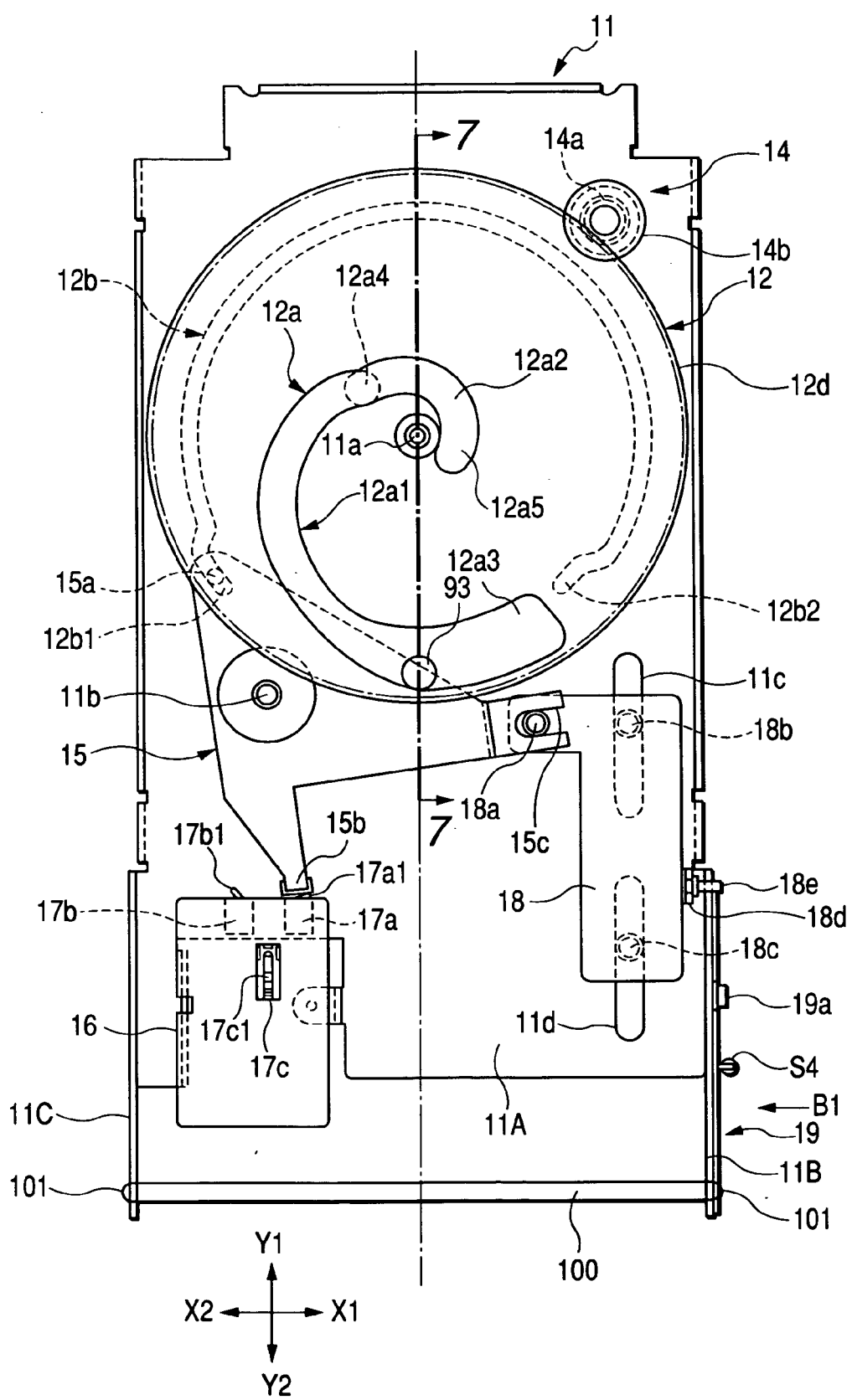
FIG. 4 is a plan view showing the lower chassis in an initial state prior to inserting the recording medium.
Figure 5:
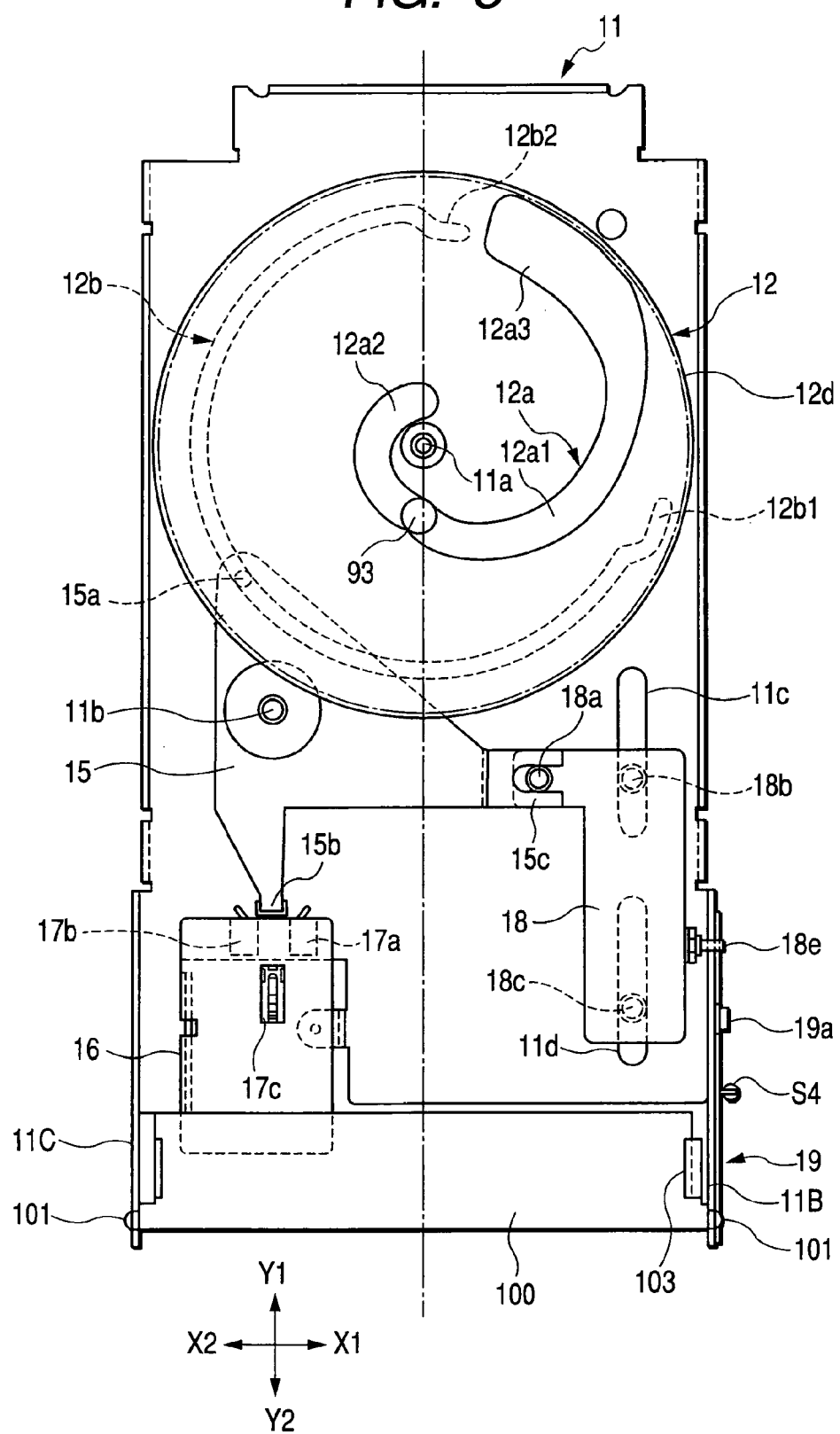
FIG. 5 is a plan view showing the lower chassis in a carrying state in which the inserted recording medium is being moved.
Figure 6:
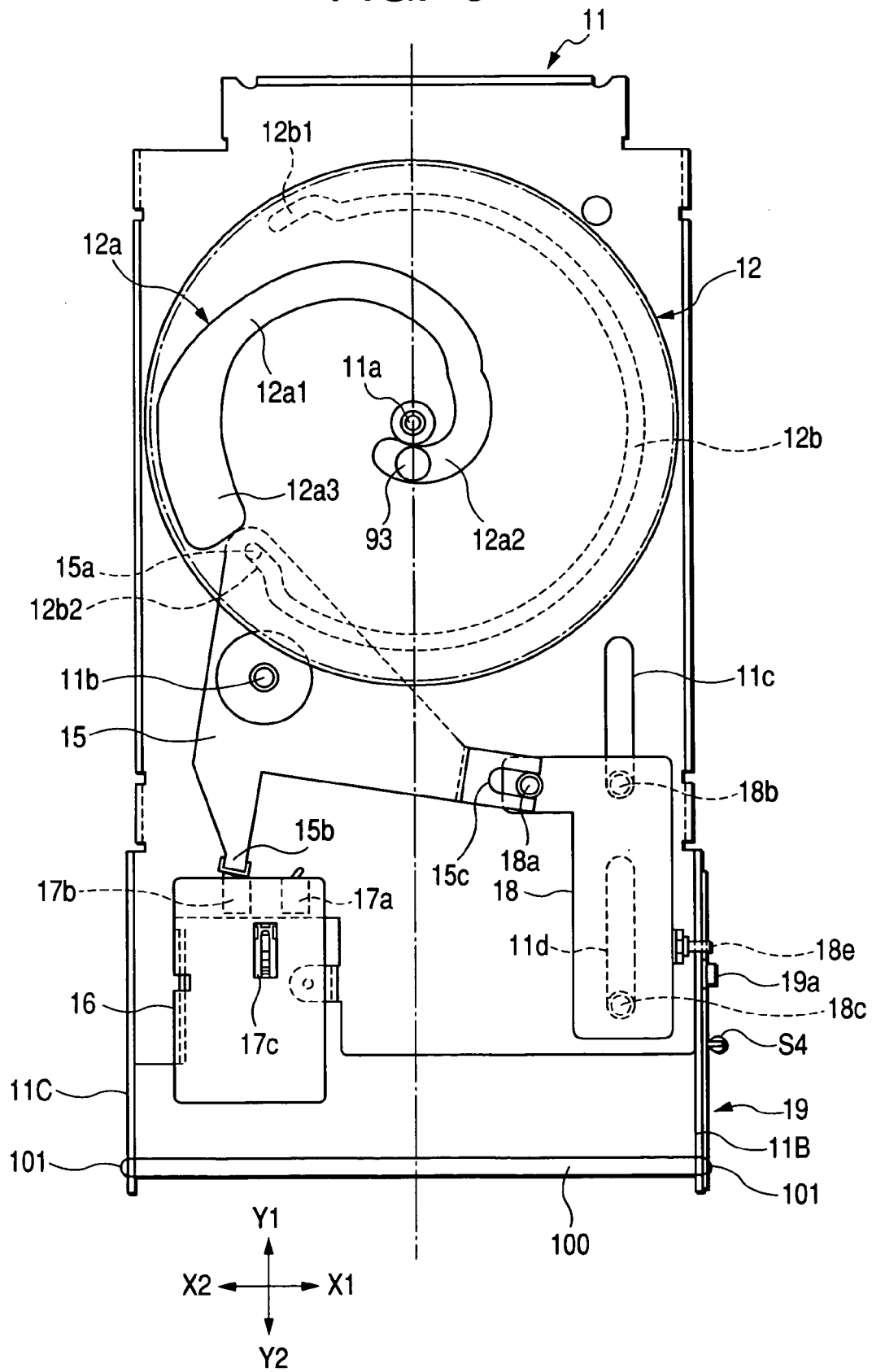
FIG. 6 is a plan view showing the lower chassis in a termination state when the recording medium has been carried.

FIG. 2 is an exploded perspective view showing an internal construction of the recording medium loading device of the embodiment of the present invention, FIG. 3 is an exploded perspective view showing the construction of a lower chassis and a door device, FIGS. 4 to 6 are plan views showing the lower chassis, FIG. 4 shows an initial state prior to inserting the recording medium, FIG. 5 shows a carrying state during which the inserted recording medium is moving, FIG. 6 shows a termination state when the recording medium has been carried.

Figure 7:
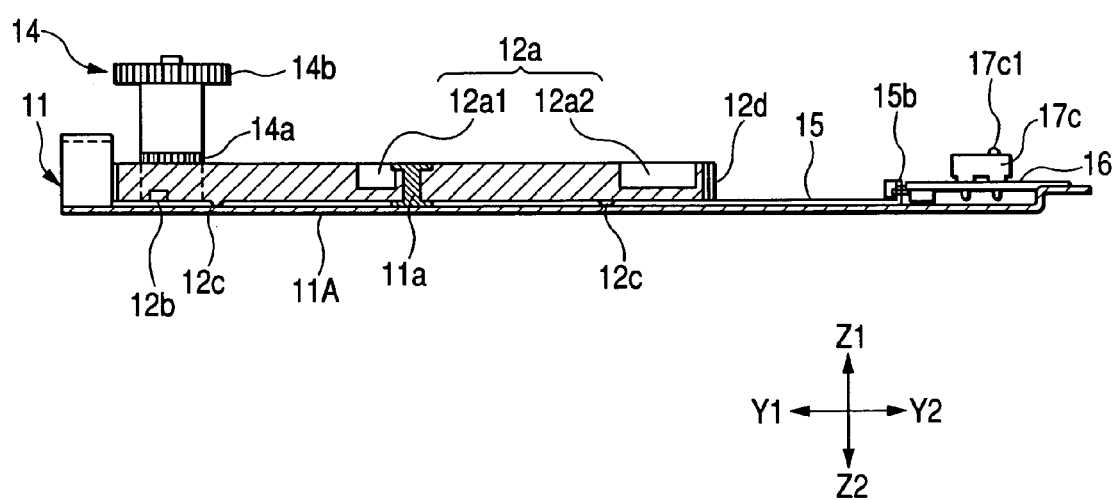
FIG. 7 is a cross-sectional view taken along a line 7-7 in FIG. 4.
Figure 8:
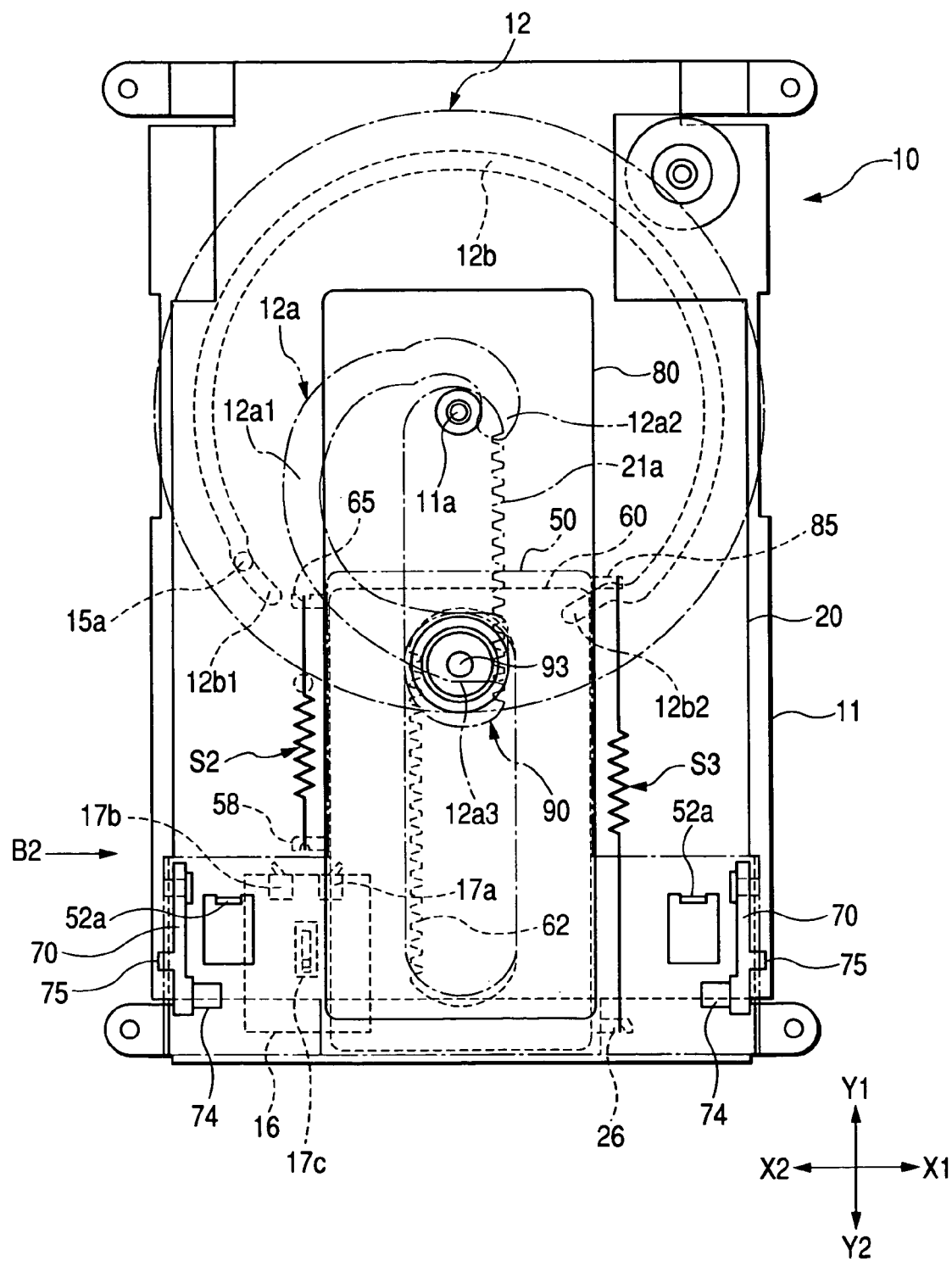
FIG. 8 is a plan view showing the recording medium loading device in the initial state corresponding to FIG. 4.
Figure 9:
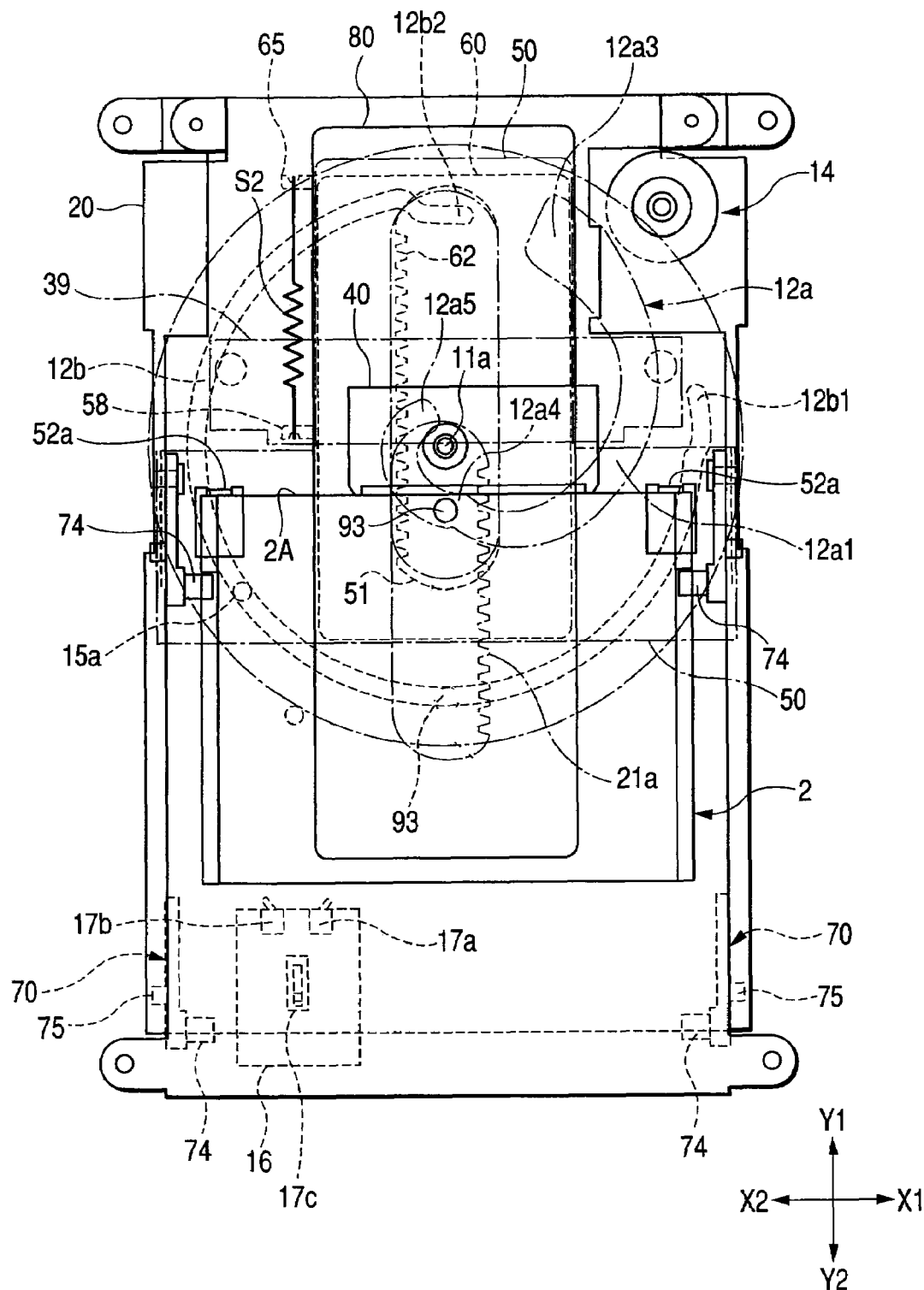
FIG. 9 is a plan view showing the recording medium loading device in the carrying state corresponding to FIG. 5.
Figure 10:
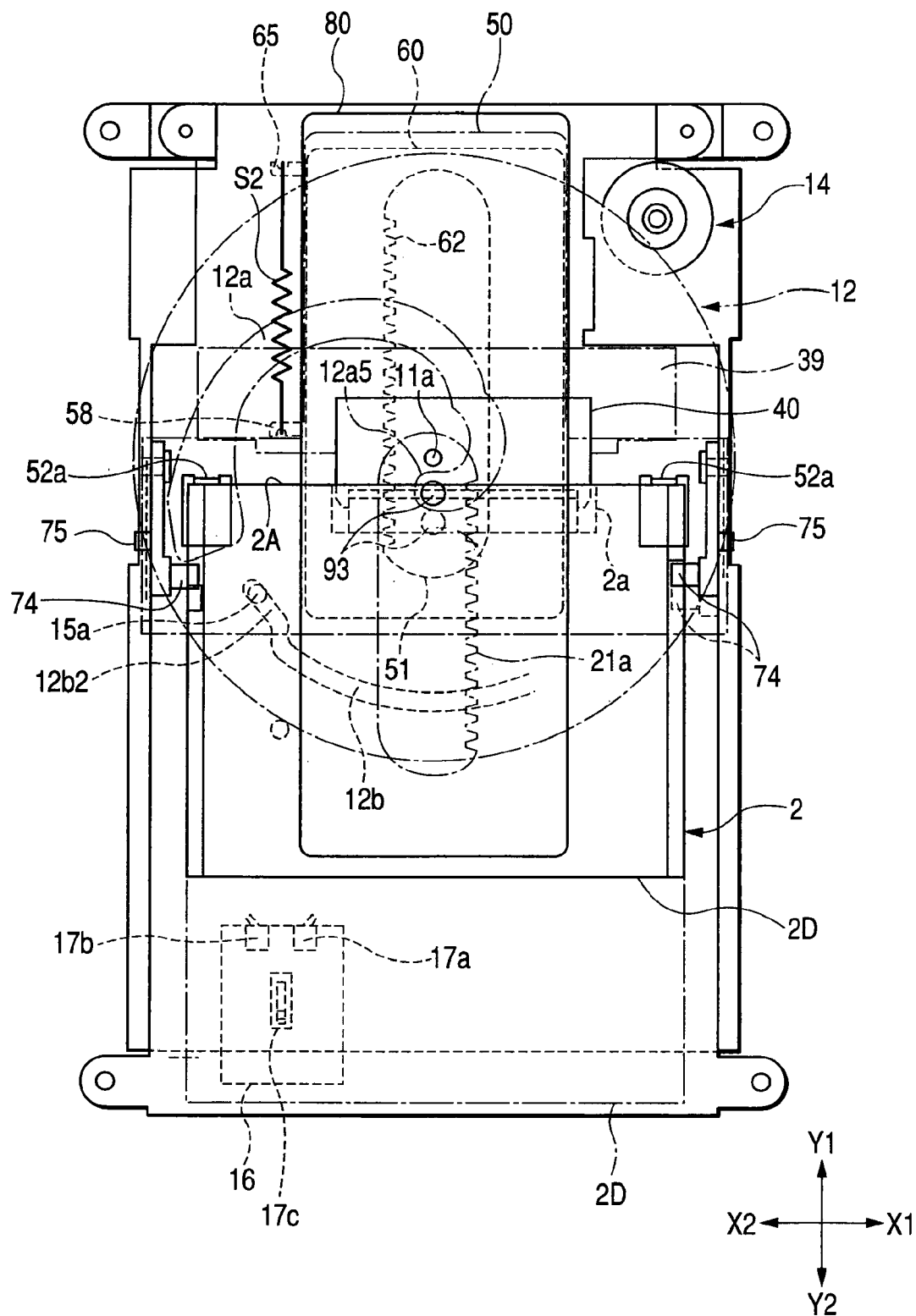
FIG. 10 is a plan view showing the recording medium loading device in the termination state corresponding to FIG. 6.

FIG. 7 is a cross-sectional view of FIG. 4 taken along a line 7-7 in FIG. 4, FIGS. 8 to 10 are plan views showing the recording medium loading device, FIG. 8 is showing the initial state corresponding to FIG. 4, FIG. 9 is showing the carrying state corresponding to FIG. 5, and FIG. 10 is showing the termination state corresponding to FIG. 6. Further, in FIGS. 8 to 10, a guide member 30 and different kinds of elongated holes are not shown.

Figure 11:
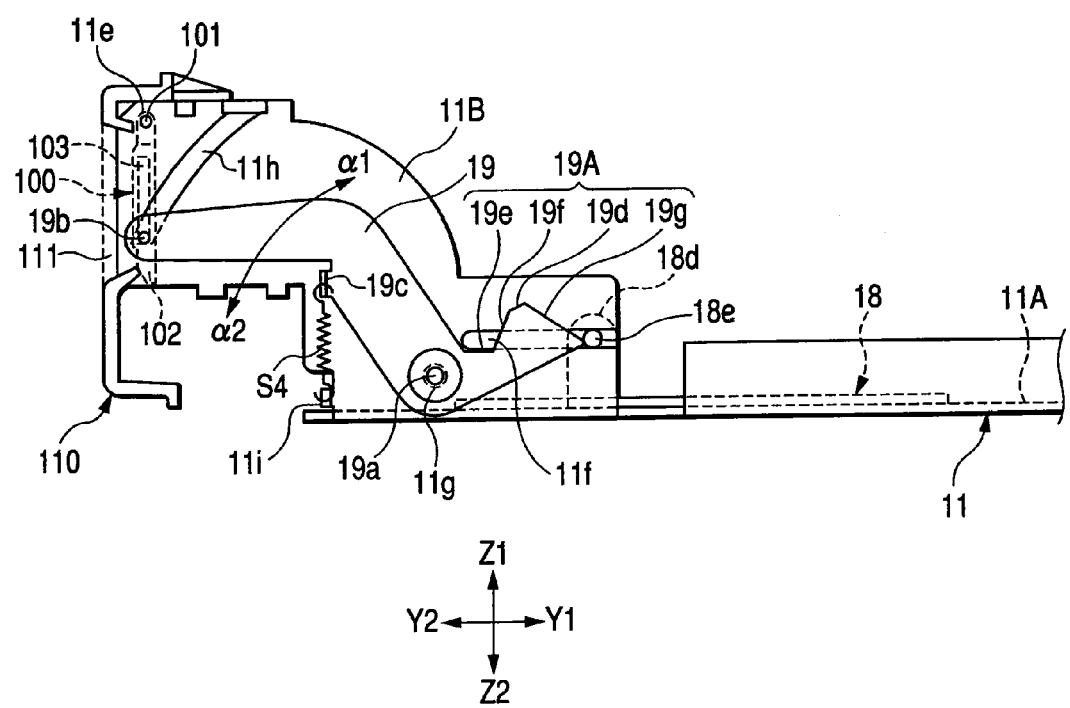
FIG. 11 is a side view showing an opening and closing device taken in a direction of an arrow B1 in FIG. 4.

FIG. 11 is a side view showing an opening and closing device taken in the direction of an arrow B1 in FIG. 4, FIG. 12 is a fragmentary side view showing the operation of the opening and closing device when taken in the same direction of FIG. 4, FIG. 12A shows the initial state corresponding to FIG. 4 and FIG. 8, FIG. 12B shows the carrying state corresponding to FIG. 5 and FIG. 9, FIG. 12C is showing the termination state corresponding to FIG. 6 and FIG. 10.

Figure 15:
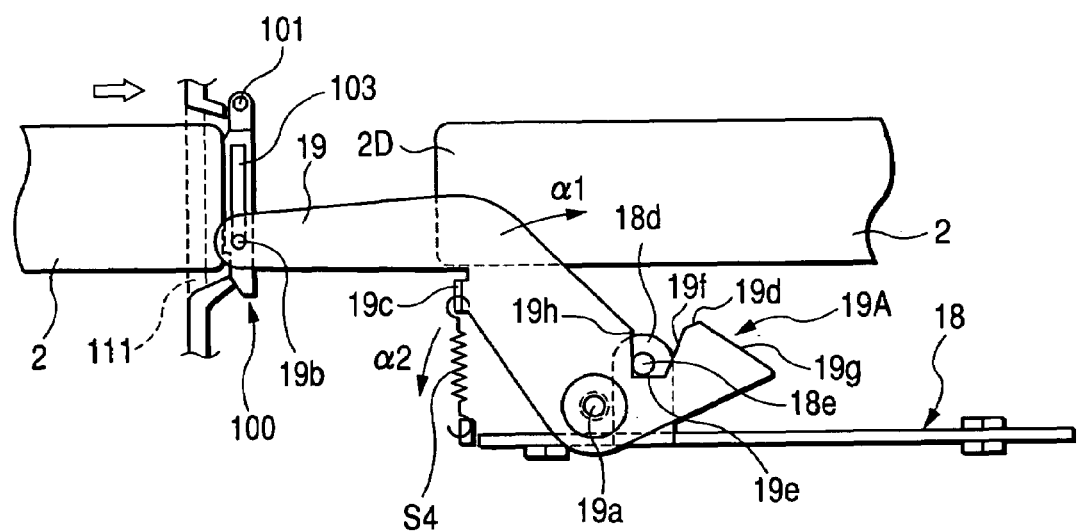
FIG. 15 is a fragmentary side view showing a device for preventing the double insertion of cartridge and the same portion of FIG. 12C.

FIGS. 13 and 14 are enlarged side views showing a front portion of the recording medium loading device taken in the direction of an arrow B2 in FIG. 8, FIG. 13 is showing the initial state corresponding to FIG. 4 and FIG. 8, FIG. 14 is showing the state the recording medium is inserted and engaged by a draw-in member, FIG. 15 is a fragmentary side view showing a device which prevents the double insertion of cartridge and the same portion of FIG. 12C.

The recording medium loading device 10 of the present invention is mounted in, for example, a computer and a main body (not shown) of an audio-video equipment for indoors or vehicles. Recording or playing back of digital data is performed between the recording medium 1 and the main body via the recording medium loading device 10.

In the recording mounting device 10 shown in FIG. 2 and FIG. 3, a lower chassis 11 made of a metal plate is arranged at a lower part of the Z2 side, a base chassis 20 made of a metal plate is formed at an upper part (the Z1 side) of the same, and both chassis 11 and 20 are arranged parallel to face each other.

A shaft 11a is formed on a base plate 11A of the lower chassis 11, and a big disk-shaped rotation cam 12 is rotatably supported in the shaft 11a. As shown in FIGS. 4 and 7, a sliding groove 12a is formed on a front surface (the face of the Z1 side) of the rotation cam 12, a cam portion 12b for opening/closing and a sliding rib 12c are formed on a rear surface (the face of the Z2 side). Further, a gear tooth 12d is provided circumferentially at an outer peripheral face of the rotation cam 12.

As shown in FIG. 4, the sliding groove 12a is formed by connecting 2 kinds of arc shaped grooves which connect an inner peripheral side and an outer peripheral side. Namely, in the rotation cam 12, a big arc shaped groove 12a1 having a curvature of which diameter is gradually smaller from the outer peripheral side to the inner peripheral side is formed along substantially half the circumference of the rotation cam 12. On the inner peripheral side, a small arc shaped groove 12a2 having a curvature smaller than that of the big arc shaped groove 12a1 is formed along substantially half the circumference of the rotation cam 12. Further, a portion where the big arc shaped groove 12a1 is changed into the small arc shaped groove 12a2 is a connecting portion 12a4.

In addition, a groove width on the outer peripheral side (the outer peripheral side of the big arc shaped groove 12a1) of the sliding groove 12a is further enlarged compared to a groove width on the inner peripheral side and the small arc shaped groove 12a2 to form a wide width portion 12a3. An innermost peripheral portion 12a5 of the sliding groove 12a (the innermost peripheral of the small arc shaped groove 12a2) is formed near the shaft 11a.

The cam portion 12b for opening/closing is a cam groove formed annularly on the rear surface (the surface of the Z2 side) of the rotation cam 12 along substantially three quarters the circumference with a predetermined radius. Exceptionally, an outer peripheral end 12b1 (rotation start position) which is an end of the cam portion 12b for opening/closing is formed to have a radius slightly larger than the predetermined radius, an inner peripheral end 12b2 (terminated rotating position) which is the other end of the cam portion 12b for opening/closing is formed to have a radius slightly smaller than the predetermined radius. Further, the wide width portion 12a3 which forms the outer peripheral side of the sliding groove 12a is formed between the outer peripheral end 12b1 and the inner peripheral end 12b2 of the cam portion 12b for opening/closing.

The sliding rib 12c is formed in a ring shape inside the cam portion 12b for opening/closing, as shown in FIG. 7, and the cross section of the sliding rib is in the form of a convex projecting toward the Z2 direction. That is, the rotation cam 12 is designed to rotate about the shaft 11a with the sliding rib 12c sliding on the base plate 11A of the lower chassis 11. The sliding rib 12c allows friction resistance caused by sliding to be reduced.

As shown in FIG. 3 and FIG. 4, a cylindrical transfer gear 14 is rotatably formed in the vicinity of the rotation cam 12 on the base board 11A of the lower chassis 11, a gear tooth 14a formed on the lower part of the transfer gear 14 is engaged with the gear tooth 12d of the rotation cam 12. A gear 14b with a larger diameter is formed integrally with the top of the transfer gear 14, and is engaged with a worm wheel M1 of the actuating motor fixed on the base chassis 20 shown in FIG. 2. Therefore, power generated by the actuating motor M is transferred via the worm wheel M1 and the transfer gear 14, whereby the rotation cam 12 rotates clockwise or counter-clockwise.

As shown in FIG. 3 and FIG. 4, a rocking shaft 11b is formed in the vicinity of the outer peripheral side of the rotation cam 12 and on the base board 11A of the lower chassis 11, and a rocking member 15 is rockably supported by the rocking shaft 11b. The rocking member 15 is formed with a substantially triangular thin film. A control pin 15a which projects toward the Z1 direction is formed at an end portion in the Y1 direction, a pressing portion 15b bent in the Z1 direction is formed at an end portion in the Y2 direction, and an engaging groove 15c cut out in the form of a U is formed at an end portion in the X1 direction of the rocking member 15.

The end portion in the Y1 direction of the rocking member 15 is inserted into a gap between the base board 11A and the rotation cam 12, the control pin 15a is inserted into the cam portion 12b for opening/closing formed on the rear surface of the rotation cam 12.

The pressing portion 15b of the rocking member 15 is arranged to face a first switch member 17a and a second switch member 17b formed on a board 16. That is, as shown in FIG. 3 and FIG. 4, the board 16 is formed in a front position on the illustrated Y2 side of the lower chassis 11, the first switch member 17a and the second switch member 17b are fixed on a lower surface the board 16, and a third switch member 17c is fixed on a upper surface of the board 16.

The first switch member 17a is arranged abreast of the second switch member 17b in the X direction on an edge in the Y1 side of the board 16. The first switch member 17a and the second switch member 17b include actuators 17a1, 17b1 which project toward the Y1 direction from the edge of the board 16. Whenever the actuators 17a1, 17b1 are operated in the X1 and X2 directions, the switch is switched over. The pressing portion 15b of the rocking member 15 is arranged in front of the actuators 17a1, 17b1 to face them.

The third switch member 17c has an actuator 17c1 which projects toward the Z1 direction and is capable of moving forward and backward. The third switch member 17c is switched over whenever the actuator 17c1 is pressed.

The engaging groove 15c formed in the X1 direction of the rocking member 15 is engaging an engaging pin 18a which projects from a sliding plate 18 formed on the lower chassis 11. The sliding plate 18 is formed with a substantially L shaped thin film, and has the engaging pin 18a which projects toward the Z1 direction and guide pins 18b, 18c which project toward the Z2 direction. A bent piece 18d bent in the Z1 direction is formed integrally with an edge in the X1 direction of the sliding plate 18, and a control convex portion 18e which projects in the X1 direction is formed on the face of the X1 side of the bent piece 18d.

Elongated holes 11c, 11d are formed in the base plate 11A of the lower chassis 11, the guide pins 18b is inserted into the elongated holes 11c and the guide pins 18c is inserted into the elongated holes 11d respectively. The sliding plate 18 is guided by the elongated holes 11c, 11d and the guide pins 18b, 18c, to thereby linearly move in the Y1 and Y2 direction.

As shown in FIG. 4, when the rotation cam 12 rotates clockwise to the full extent and the control pin 15a reaches the outer peripheral end 12b1 of the cam portion 12b for opening/closing, the rocking member 15 rocks counter-clockwise about the rocking shaft 11b. At this moment, the pressing portion 15b presses the actuator 17a1 of the first switch member 17a in the X1 direction in the drawing to switch over the first switch member 17a. At the same time, the engaging groove 15c of the rocking member 15 presses the engaging pin 18a in the Y1 direction to move the sliding plate 18 towards a first closed position of the Y1 direction.

Also, if the rotation cam 12 rotates counter-clockwise to the full extent and the control pin 15a reaches the inner peripheral end 12b2 of the cam portion 12b for opening/closing, the rocking member 15 rocks clockwise. At this moment, the pressing portion 15b presses the actuator 17b1 of the second switch member 17b in the X2 direction in the drawing to switch over the second switch member 17b. At the same time, the engaging groove 15c of the rocking member 15 presses the engaging pin 18a in the Y1 direction to move the sliding plate 18 towards a second closed position of the Y2 direction.

When the control pin 15a is positioned in the cam portion 12b for opening/closing except the outer peripheral end 12b1 and the inner peripheral end 12b2, the pressing portion 15b of the rocking member 15 is set in a neutral position not abutting any one of the first switch member 17a and the second switch member 17b. At this moment, the engaging groove 15c of the rocking member 15 sets the sliding plate 18 in an open position which lies halfway between the first closed position and the second closed position.

Therefore, the switch of the first switch member 17a and the second switch member 17b is detected by a control portion, whereby it is possible to grasp whether the operation mode of the recording medium loading device 10 is in the initial state where the rotation cam 12 has rotated clockwise to the full extent, that is, the rotation start position (refer to FIG. 4, FIG. 8), or the rotation cam 12 has rotated counter-clockwise to the full extent, that is, the terminated rotating position (refer to FIG. 6, FIG. 10), or the operation mode is in a loading state except those states (refer to FIG. 5, FIG. 9).

Furthermore, switch signals indicating individual states of the first switch member 17a to the third switch member 17c is sent to the control portion (not shown) formed inside main body of the device.

As shown in FIG. 3 and FIG. 11, in the Y2 direction of the lower chassis 11, side faces 11B, 11C are formed by bending a metal plate. On both side faces 11B, 11C, shaft holes 11e, 11e are formed in a symmetric position, a door 100 is rockably supported by the shaft holes 11e, 11e. Namely, on both ends in the X direction on the door 100, shaft portions 101, 101 are projected and the shaft portions 101, 101 are inserted through the shaft holes 11e, 11e. Furthermore, on a side face 102 in the X1 direction of the door 100, a manipulating groove 103 which extends in the Z direction in the drawing is formed.

In the front position (the Y2 direction) of the door 100, a nose portion 110 including an insertion opening 111 in which the recording medium 1 is inserted is formed. The door 100 is capable of closing the insertion opening 111 by facing the insertion opening 111.

As shown in FIG. 3 and FIG. 11, a linear elongated guide hole 11*f* whose edge on the Y1 side is open is formed on the Y1 side of the side face 11B, and a shaft hole 11*g* is formed in the vicinity of the elongated guide hole 11*f*. The control convex portion 18*e* formed on the sliding plate 18 is inserted into the elongated guide hole 11*f*, and the control convex portion 18*e* is movable inside the elongated guide hole 11*f* in the Y direction when the sliding plate 18 moves. Because of this, the control convex portion 18*e* can linearly move in the Y direction in a state where a constant height is maintained.

A substantially crank shaped manipulating member 19 is mounted in the shaft hole 11*g*. As shown in FIG. 11, a shaft portion 19*a* which projects toward the X2 direction in the drawing is formed on a bent portion of the lower end side of the manipulating member 19, a manipulating pin 19*b* is formed on a front end of the Y2 side. The shaft portion 19*a* is inserted into the shaft hole 11*g* on the side face 11B, the manipulating member 19 is supported to rotate freely in the α1 and α2 direction about the shaft portion 19*a* in FIG. 11. A arc shaped groove 11*h* whose center of curvature is the shaft hole 11*g* is formed on the side 11B, the manipulating pin 19*b* is inserted through the arc shaped groove 11*h*, and at the same time, is movable along the manipulating groove 103 formed in the door 100.

As shown in FIG. 11, on an end of the Y1 side of the manipulating member 19, a door setting portion 19A which sets the door 100 in an open position or a closed position by rotating the manipulating member 19 in the α1 and α2 directions is formed. The door setting portion 19A is composed of a convex portion 19*d* and a concave portion 19*e* of a door setting portion, the convex portion 19*d* and the concave portion 19*e* are connected by an inclined portion 19*f* located therebetween. An inclined portion 19*g* is formed on a front end of the convex portion 19*d* as well.

A locking piece 19*c* is formed on an upper bent portion of the manipulating member 19, and a locking piece 11*i* is formed on the lower chassis 11. A biasing member S4 composed of a coil spring is formed between the locking piece 19*c* and the locking piece 11*i*, and the biasing member S4 always pulls the manipulating member 19 in the α2 direction.

As shown in FIG. 11, in the initial state when the manipulating member 19 is pulled in the α2 direction, the manipulating pin 19*b* abuts a lower end in the Z2 direction of the arc shaped groove 11*h*. At this moment, the front end of the inclined portion 19*g* of the door setting portion 19A abuts the lower portion of the control convex portion 18*e*. At this time, the sliding plate 18 having the control convex portion 18*e* moves to the first closed position in the Y1 direction. (Refer to FIG. 4)

As shown in FIG. 2, the base chassis 20 is formed by pressing and blanking a metal plate. On the center of the base chassis 20, an opening 21 is formed in a substantially oval shape, a first rack portion 21*a* is formed at the peripheral side of the X1 side of the opening 21. On both ends in the direction (the X1 and X2 direction) of the width of the base chassis 20, elongated holes 22*a* and 22*b* elongated in the Y direction in the drawing are formed in a symmetrical position. Portions to be pressed 52*a* and 52*a* formed on a moving member 50, which will be described later, are inserted through the elongated holes 22*a* and 22*b*. Elongated guide holes 23*a*, 23*b* elongated in the Y direction are formed on both sides of the opening 21, an elongated hole 24 elongated in the Y direction is formed between the one-way elongated hole 22*b* and the one-way elongated guide hole 23*b*.

A pair of guide members 30 and 30 formed of synthetic resin is fixed to both ends of the width direction of the base chassis 20. The guide member 30 has a bottom face 31, a side face 32 and a top face 33 formed to have a U-shaped cross section, the side face 32 and the top face 33 extend in the Y direction in the drawing. The X1 and X2 sides of the cartridge 2 are inserted into the area surrounded by these three faces. On front end of the three faces—the bottom face 31, the side face, 32 and the top face 33—inclined faces 31*a*, 32*a*, and 33*a* are respectively formed. An area surrounded by the inclined faces 31*a*, 32*a*, and 33*a* constructs an insertion portion 10A of the recording medium loading device 10. In a front position (the Y2 direction) of the insertion portion 10A, the insertion opening 111 formed in the door 100 and the nose portion 110 is formed.

An elongated hole 31*b* elongated in the Y direction in the drawing and mounting holes 31*c*, 31*d* are formed on the bottom face 31. If the mounting holes 31*c* and 31*d* are positioned and fitted in the fixing holes 20*a* and 20*b* formed on the base chassis 20 and then screwed to the fixing holes 20*a* and 20*b*, the elongated holes 22*a* and 22*b* of the base chassis 20 and the elongated holes 31*b*, 31*b* overlap.

In a front position of the side face 32, an extended side face 32A which projects toward the Z1 direction from the side face 32 is integrally formed. On the side face 32, a elongated guide hole 32*c* elongated in the Y direction is formed. On the front end in the Y2 direction of the elongated guide hole 32*c*, an inclined portion 32*d* coming from the elongated guide hole 32*c* to be obliquely extended to the upper direction (the Z1 direction) is formed. A rectangular supporting hole 32*e* which is continuous with the inclined portion 32*d* is formed along the side face 32 and the extended side face 32A. The lower end on the Y2 side of the supporting hole 32*e* is a supporting portion 32*f*, the edge on the Y1 side is a regulation portion 32*g*. On the Y1 side of an internal wall of the side face 32, a guide projected portion 32*h* which projects with a convex shape (inside of the drawing) and extends in the Y direction is formed.

An interior connector 40 which becomes a supportive side of the base chassis 20 is formed in a state where the interior connector is fixed to a board 39. The interior connector 40 has an insulated exterior cover 41 which covers the entire of the interior connector 40. A font side (the Y2 side) of the exterior cover 41 is a connecting portion 42, and an opening portion 43 is formed in the connecting portion 42.

In the interior connector 40, for example, a plurality of conductive joining terminals having elasticity is formed abreast in the width direction on the upper and lower faces of the opening portion 43. When the insertion connector 3 in the recording medium 1 side is inserted into the opening portion 43, the interior connector 40 is a connector to which individual conductive portions 3*a* formed on both front and rear sides of the board of the insertion connector 3 are elastically pressed by individual connecting terminals in the interior connector 40 side to thereby be connected. Otherwise, when the insertion connector 3 on the recording medium 1 side is a connecting pin, the interior connector 40 is a type of connector arranging a plurality of receptacles which the connecting pin can be inserted into.

Screw holes 39a and 39a are formed on both ends in the width direction of the board 39, the board 39 is fixed by being screwed by a screw member (not shown) with the screw holes 39a and 39a being overlapped with the mounting holes 31d, 31d of the guide member 30.

As shown in FIG. 2, a moving member 50 and a movable member 60 are formed between the lower chassis 11 and the base chassis 20. The moving member 50 has a base 50A formed into a T shaped plane by bending a metal plate and side portions 50B and 50B formed by bending both ends of a wide width portion of the base 50A perpendicularly. In the middle of the base 50A, an opening 51 formed in a substantially oval shape is excavated. Cutout holes 52 and 52 are formed in the vicinity of the side portions 50B on the base 50A, portions to be pressed 52a and 52a whose one portion is bent perpendicularly are formed on an edge of the cutout holes 52 and 52. In the moving member 50, a pressing portion 53 formed by recessing a portion of the base 50A in the Z2 direction in the drawing is formed. As shown in FIG. 13, the pressing portion 53 is disposed to face the third switch member 17c.

Guide pins 54 and 55 which project vertically from the base 50A are formed in the vicinity of the opening 51 of the moving member 50. The function of the guide pins 54, 55 will be described later.

Windows 56, 56 are formed on the side portions 50B, 50B of the moving member 50, draw-in members 70, 70 are formed in the vicinity of the windows 56, 56. The draw-in member 70 is formed of synthetic resin and supported to rotate freely about a shaft 71 formed on the Y1 side of the side portion 50B.

The draw-in member 70 has an arm portion 72 which extends in the Y2 direction and a locking piece 73 which extends in the Z1 direction. An engaging portion 74 which projects inward is formed on an inner face of a front end of the arm portion 72. A regulatory projection 75 which projects outward is formed on an outer face of the arm portion 72 to be inserted into the window 56. Therefore, the draw-in member 70 is supported to rock vertically about the shaft 71 as long as the regulatory projection 75 abuts an upper and a lower peripheral side of the window 56. Locking pieces 57, 57 extending in an illustrated Z1 direction are integrally formed on a front end in the Y2 direction of the side portions 50B, 50B of the moving member 50. The locking pieces 57, 57 are slightly bent inward, biasing members S1, S1 composed of a coil spring or the like are installed between the locking pieces 57, 57 and the locking pieces 73, 73 of the draw-in member 70. Therefore, the draw-in member 70 is urged in the direction that an end of the arm portion 72 rotates downward (the Z2 direction in the drawing).

The movable member 60 is formed of a metal plate. On the middle of the movable member 60, an opening portion 61 excavated in a substantially oval shape is formed. A second rack portion 62 is formed at the peripheral side of the X2 side of the opening portion 61.

The dimension of the width direction (the X direction) of the movable member 60 is formed substantially equal to the smaller width dimension of the base 50A of the movable member 50, the movable member 60 abuts a bottom surface (the Z2 side surface) of the base 50A. Elongated guide holes 63, 64 elongated in the Y direction are formed on both sides of the opening portion 61 of the movable member 60, lower ends of the guide pins 54, 55 formed on the moving member 50 is inserted into the elongated guide holes 63, 64. The movable member 60 is supported to a bottom face of the moving member 50 by the guide pins 54, 55, and is movable along the elongated guide holes 63, 64 in the Y direction.

On the Y1 side and the X2 side edge of the movable member 60, a locking portion 65 which projects in the X2 direction in the drawing is formed. A biasing member S2 (a first biasing member) composed of a coil spring or the like is installed between the locking portion 65 and the locking portion 58 formed on the side face of the base 50A of the moving member 50. Therefore, the movable member 60 and the moving member 50 always pull each other in the Y direction in which both of the members approach each other in a state where the movable member 60 and the moving member 50 are overlapped. Generally, lower ends of the guide pins 54, 55 formed on the moving member 50 abut the Y1 side end of the elongated guide holes 63, 64 of the movable member 60.

As shown in FIG. 2, a rectangle metal plate slide member 80 is formed in an area between the one-way guide member 30 and the other-way guide member 30 on the base chassis 20. A shaft 81 is formed in the middle of the slide member 80, the front end of the shaft 81 is inserted into a hole formed in the slide member 80, and the shaft 81 extends in the Z2 direction. A moving gear 90 is rotatably formed at the front end of the shaft 81. The moving gear 90 is composed of a two stages gear where a small-diameter pinion gear 92 is constantly formed on a large-diameter pinion gear 91, and a sliding pin 93 which projects in the Z2 direction in the drawing is formed on a bottom face of the large-diameter pinion gear 91. N1 stands for the gear tooth number of the large-diameter pinion gear 91, and N2 stands for the gear tooth number of the small-diameter pinion gear 92. The relation between them follows N1>N2.

Two elongated guide holes 82, 83 elongated in the Y direction are formed on both peripheral portions of the width direction of the slide member 80, and front ends of the guide pins 54, 55 formed on the moving member 50 are inserted into the elongated guide holes 82, 83. That is, the guide pins 54, 55 are inserted through the elongated guide holes 23a, 23b of the base chassis 20, and the front ends are inserted into the elongated guide holes 82, 83 of the slide member 80. Therefore, the slide member 80 becomes movable linearly in the Y direction in the drawing by the guide pins 54, 55 and the elongated guide holes 82, 83. The slide member 80 is movable in the Y direction on the surface of the base chassis 20, and when moving in the Y1 direction, the slide member 80 moves in a gap formed between the base chassis 20 and the board 39.

In the vicinity of the elongated guide hole 83, a projection piece 84 which projects in the X1 direction from an edge of the slide member 80 in a triangle shape and is bent in the Z2 direction in the drawing is formed. The projection piece 84 is inserted into the elongated hole 24 formed on the base chassis 20, and the front ends reaches a bottom face of the base chassis 20. A locking portion 85 is formed on a front end of the projection piece 84, a biasing member S3 (a second biasing member) composed of a coil spring or the like is installed between the locking portion 85 and the locking portion 26 formed on the front position of the base chassis 20. Therefore, the slide member 80 is always pulled forward (in the Y2 direction in the drawing) on the base chassis 20.

When the slide member 80 is mounted on the surface of the base chassis 20, a small-diameter pinion gear 92 of the moving gear 90 is being engaged with the first rack portion 21a formed in the opening 21 of the base chassis 20. Further, a large-diameter pinion gear 91 of the moving gear 90 is inserted into the opening portion 61 of the movable member 60 and the opening 51 of the moving member 50, and is engaged with the second rack portion 62 formed in the movable member 60. That is, the moving gear 90 is engaged with both sides of the X direction by the first rack portion 21a and the second rack portion 62.

The sliding pin 93 formed on the moving gear 90 is inserted into the sliding groove 12a formed on the surface of the rotation cam 12, and is movable inside the sliding groove 12a.

Hereinafter, how the recording medium loading device 10 is operated will now be described.

(Initial State)

As shown in FIG. 4 and FIG. 12A, in an initial state prior to inserting the cartridge 2 of the recording medium 1 in the insertion opening 111, as described above, the rotation cam 12 rotates in the maximum clockwise direction and the sliding plate 18 moves to the first closed position (the farthest position to the Y1 direction) of the Y1 direction. Further, the front end of the inclined portion 19g of the door setting portion 19A abuts the lower portion of the control convex portion 18e, and the manipulating member 19 rotates in the α2 direction by the biasing force of a biasing member S4. At this moment, because the manipulating pin 19b is located in the lower end in the Z2 direction of the arc shaped groove 11h and the manipulating pin 19b presses the manipulating groove 103 of the door 100 in the Y2 direction in the drawing, the door 100 is set in the closed position where the door 100 has rotated clockwise about the shafts 101, 101 as shown in FIG. 11 and FIG. 12A.

Also as shown in FIG. 4 and FIG. 8, the sliding pin 93 of the moving gear 90 is located on the Y2 side (a side getting away from the shaft 11a) inside the wide width portion 12a3 of the sliding groove 12a formed on the rotation cam 12.

At this moment, as shown in FIG. 8, by the biasing force of the biasing member S2, the moving member 50 and the movable member 60 have moved to an insertion standby position in the Y2 direction in the drawing in a state where both members are substantially integrated. In the same manner, the slide member 80 has moved to the insertion standby position by the biasing force of the biasing member S3.

As shown n FIG. 13, in the initial state, the moving member 50 has moved to the insertion standby position. As a result, the arm portion 72 of the draw-in member 70 rotates counter-clockwise in FIG. 13 resisting the biasing force of the biasing member S1. That is, the engaging portion 74 of the draw-in member 70 is supported by the supporting portion 32f inside the supporting hole 32e which has climbed the inclined portion of the guide member 30.

The actuator 17c1 of the third switch member 17c is pressed by the pressing portion 53 of the moving member 50, the switch of the third switch member 17c is set OFF. Therefore, the control portion can detect that the concave portion 2d of the cartridge 2 is not engaged with the draw-in member 70.

As shown in FIG. 4, the rocking member 15 rotates counter-clockwise, and the actuator 17a1 of the first switch member 17a is pressed by the pressing portion 15b, and the first switch member 17a is set ON and the second switch member 17b is set OFF. Therefore, the control portion can detect from the rotation state of the rotation cam 12 that the moving member 50 is positioned in the insertion standby position.

(Inserting Operation)

In the initial state, if the cartridge 2 of the recording medium 1 is inserted into the insertion opening 111 of the nose portion 110, as shown in FIG. 12B, because the front face 2A of the cartridge 2 presses the front face of the door 100 in the Y1 direction, the door 100 is set in an open position where the door 100 has rotated inward of the recording medium loading device. At this moment, because the manipulating pin 19b moves in the Z1 direction in the drawing inside the arc shaped groove 11h by being pressed by the manipulating groove 103, the manipulating member 19 rotates in the α1 direction resisting the biasing member S4, and the inclined portion 19g of the door setting portion 19A is separated from the control convex portion 18e.

As shown in FIG. 13, if the cartridge 2 is inserted into the insertion portion 10A through the insertion opening 111, both side faces 2B and 2B of the cartridge 2 are guided in the inserting direction (Y1 direction) with side faces 2B and 2B interposed among the bottom face 31, the side face 32 and the top face 33 of the guide members 30 and 30 formed on both ends in the X direction.

If the cartridge 2 is inserted into the inserting direction, the front face 2A of the cartridge 2 abuts the portions to be pressed 52a, 52a formed in the moving member 50, and the moving member 50 moves in the inserting direction along with the cartridge 2 resisting the biasing force of the biasing member S3. When the cartridge 2 is inserted, because the biasing force of the biasing member S3 can be used as a damper of the moving member 50, the insertion feeling of the recording medium loading device 10 can be improved.

Here, if the moving member 50 moves in the inserting direction, because lower ends of the guide pins 54, 55 of the moving member 50 press the end of the Y1 side of the elongated guide holes 63, 64 of the moving member 60 in the inserting direction, the moving member 50 moves integrally with the movable member 60 in the inserting direction. At this moment, the moving gear 90 having the large-diameter pinion gear 91 which is engaged with the second rack portion 62 of the movable member 60 moves in the inserting direction as well. However, the sliding pin 93 of the moving gear 90 is located inside the wide width portion 12a3 of the rotation cam 12, so that the moving gear 90 can be moved in the inserting direction as far as the width dimension of the wide width portion 12a3. (Refer to FIG. 14) Therefore, the damping function by the biasing member S3 can be prevented from being disturbed by the moving gear 90.

As shown in FIG. 14, if the moving member 50 moves in the inserting direction, the draw-in member 70 moves along with the moving member 50 as well. If the engaging portion 74 of the draw-in member 70 moves from the supporting portion 32f of the guide member 30 and reaches the inclined portion 32d, the draw-in member 70 is urged clockwise in the drawing by the biasing member S1, whereby the engaging portion 74 can lower the inclined portion 32d. Exceptionally, in the insertion initiation stage, because the engaging portion 74 is supported by the step portion 2c formed on the side face 2B of the cartridge 2, rotation of the draw-in member 70 is limited, thus, the engaging portion 74 is controlled not to reach the elongated guide hole 32c. Further, if the cartridge 2 is inserted and reaches a position where the concave portion 2d formed on the side face 2B overlaps the inclined portion 32d of the guide member 30, the draw-in member 70 is allowed to rotate, the engaging portion 74 lowers the step portion 2c, reaches the elongated guide hole 32c, and engages the concave portion 2d.

In this way, in the aspect of the present invention, because the concave portion 2d of the cartridge 2 can be engaged in the height direction by lowering the engaging portion 74 in the height direction (the Y direction), the width dimension of the recording medium loading device can be decreased compared to engaging the cartridge 2 from a traverse direction. Therefore, the width direction of the recording medium loading device 10 can be miniaturized.

At this moment, because the pressing portion 53 formed on the moving member 50 is slipped from the actuator 17c 1 of the third switch member 17c, the switch of the third switch member 17c is switched from OFF to ON. Therefore, the control portion of the device main body can detect that the cartridge 2 is inserted into the insertion portion 10A of the recording medium loading device 10 and the concave portion 2d of the cartridge 2 is engaged by the engaging portion 74 of the draw-in member 70.

If the cartridge 2 in an abnormal state is inserted into the insertion portion 10A in a wrong manner, for example, in case that a rear face 2D side of the cartridge 2 is inserted toward the insertion portion 10A, or in case that the cartridge 2 is inserted into a condition to turn the cartridge 2 upside down, the engaging portions 74, 74 of the draw-in member 70 can not be engaged with the concave portions 2d, 2d of the cartridge 2. Because of this, the draw-in member 70 is not allowed to rotate, the draw-in member 70 is maintained in the state as shown in FIG. 13.

If the cartridge 2 in an abnormal state is inserted into the inserting direction, and the draw-in member 70 in the state shown in FIG. 13 slightly moves in the inserting direction. However, the engaging portion 74 abuts the regulation portion 32g of the supporting hole 32e, the draw-in member 70 is kept from moving further in the inserting direction. As a result, the pressing portion 53 maintains the pressing state of the actuator 17c1 of the third switch member 17c, thus the switch of the third switch member 17c can be prevented from being switched over. Therefore, the cartridge 2 heading in an abnormal direction can be prevented from being automatically carried in the inserting direction by a loading operation which will be described later. That is, the cartridge heading in an abnormal direction can be prevented from being carried inward the device in advance.

(Loading Operation of Cartridge)

The control portion rotates the rotation cam 12 counter-clockwise by initiating the actuating motor M if it is detected that the cartridge 2 is inserted into a normal direction and the third switch member 17c is switched ON.

If the rotation cam 12 rotates counter-clockwise, the sliding pin 93 arranged in the moving gear 90 moves along the sliding groove 12a in the inserting direction. At this moment, the small-diameter pinion gear 92 is engaged with the first rack portion 21a and transferred clockwise, whereby the moving gear 90 moves in the inserting direction. Further, the slide member 80 for mounting the moving gear 90 therein moves in the inserting direction by resisting the biasing member S3.

At the same time, be cause the second rack portion 62 engaged in the large-diameter pinion gear 91 is carried in the inserting direction by the clockwise rotation of the moving gear 90, the movable member 60 having the second rack portion 62 moves in the inserting direction. If the movable member 60 moves in the inserting direction, because the moving member 50 is pulled in the inserting direction (the Y1 direction) via the biasing member S2, the moving member 50 moves along with the movable member 60 in the inserting direction. Further, if the moving member 50 moves in the inserting direction, the cartridge 2 engaged by the engaging portion 74 of the draw-in member 70 mounted in the moving member 50 is automatically carried inward of the recording medium loading device 10. That is, the rotation cam 12, the moving gear 90, the moving member 50 and the draw-in member 70 construct a loading device which carries the cartridge 2 in the inserting direction.

The cartridge 2 moves in the inserting direction with both side faces 2B, 2B maintained in the area surrounded by the bottom face 31, the side face 32 and the top face 33 of the guide members 30, 30. If the cartridge 2 reaches the inward side of the guide member 30, 30, because the guide projections 32h, 32h formed on the interior wall of the guide member 30, 30 are inserted into the guide grooves 2b, 2b formed on both side faces 2B, 2B, the cartridge 2 can securely move in the inserting direction.

As shown in FIG. 5, while the cartridge 2 is being loaded, the control pin 15a of the rocking member 15 is positioned in an opening groove portion except the outer peripheral end 12b1 and the inner peripheral end 12b2 of the cam portion 12b for opening/closing the rotation cam 12, the rocking member 15 is set in a neutral position where the rocking member 15 has slightly rotated clockwise from the position in FIG. 4. Therefore, because the pressing portion 15b is positioned in the middle between the first switch member 17a and the second switch member 17b without operation, the control portion can grasp that the rotation cam 12 is in the loading state.

At this moment, by the engaging groove 15c of the rocking member 15, the sliding plate 18 is set in the open position where the sliding plate 18 has slightly moved in the Y2 direction. Therefore, as indicated by one-dot chain line in FIG. 12B, the control convex portion 18e formed on the sliding plate 18 moves to a position indicated by a solid line of the Y2 direction, so that the convex portion 19d of the door setting portion 19A of the manipulating member 19 is engaged.

(Connecting Operation of the Connector)

As shown in FIG. 9, if the sliding pin 93 passes by the connecting portion 12a4 of the sliding groove 12a, the sliding pin 93 moves in the inserting direction by the small arc shaped groove 12a2. As shown in FIG. 10, if the sliding pin 93 reaches the innermost peripheral portion 12a5 of the sliding groove 12a, the connecting portion 42 of the interior connector 40 is inserted into the opening portion 2a formed on the front face 2A of the cartridge 2 engaged in the draw-in member 70 in response to the movement of the sliding pin 93.

When the insertion connector 3 of the cartridge 2 and the opening portion 43 of the interior connector 40 are mounted, an insertion load occurs by the friction resistance cause between them. Because of this, even though the movable member 60 engaged in the large-diameter pinion gear 91 of the moving gear 90 moves in the inserting direction, the movement of the moving member 50 which includes the draw-in member 70 engaging the cartridge 2 is limited. Therefore, the insertion connector 3 is imperfectly fitted in the interior connector 40. Exceptionally, because the movable member 60 moves up to the complete loading position, the biasing member S2 installed between the movable member 60 and the moving member 50 stretches in connection with the movement of the movable member 60, tensility of the biasing member S2 is gradually improved. If the tensility of the biasing member S2 surpasses the insertion load between the insertion connector 3 and the interior connector 40, the moving member 50 moves to the complete loading position by the tensility. Therefore, the insertion connector 3 and the interior connector 40 can be fitted with each other perfectly.

If the insertion connector 3 on the cartridge 2 side is perfectly inserted into the opening portion 43 of the interior connector 40, the conductive portion 3a formed in the insertion connector 3 is electrically connected to each connecting element formed in the opening portion 43 of the interior connector 40. By this, playing and recording of digital data becomes possible between the recording medium 1 and the device main body having the recording medium loading device 10.

As shown in FIG. 10, if the insertion connector 3 has been inserted into the interior connector 40, the control pin 15a of the rocking member 15 enters the inner peripheral end 12b2 of the cam portion 12b for opening/closing of the rotation cam 12, so that the rocking member 15 rocks clockwise again as shown in FIG. 6. At this moment, because the pressing portion 15b of the rocking member 15 presses the actuator 17b1 of the second switch member 17b, the control portion can detect that the rotation cam 12 has clamped to the state where the connector has been mounted and the control pin 15a has reached the terminated rotating position of the inner peripheral end 12b2.

Also as shown in FIG. 6, if the control pin 15a of the rocking member 15 reaches the inner peripheral end 12b2, because the sliding plate 18 moves to the second closed position in the Y2 direction, the control concave portion 18e moves in the Y2 direction and engages the concave portion 19e of the door setting portion 19A of the manipulating member 19. By this, the manipulating member 19 is allowed to rotate in the α2 direction. Further, as shown in FIG. 12C, if the cartridge 2 moves to the position where the insertion connector 3 is mounted in the connector 40 and the rear surface 2D of the cartridge 2 is separated from the door 100, the manipulating member 19 rotates in the α2 direction by the biasing force of the biasing member S4, whereby the door 100 is set in the closed position.

Namely, the outer peripheral end 12b1 (the initial rotating position), a one-way end of the cam portion 12b for opening/closing, and the inner peripheral end 12b2, the other-way end (the other face) of the cam portion 12b for opening/closing form a closing groove portion which ushers the door 100 into a closed position, an opening groove portion which ushers the door 100 into a open position between the outer peripheral end 12b 1 and the inner peripheral end 12b2. Further, the rocking member 15, the sliding plate 18 and the manipulating member 19 form a opening and closing device which operates the door 100 to open and close between the closed position and the open position.

(Ejection Operation)

The ejection operation of the cartridge 2 can be performed by rotating the rotation cam 12 clockwise. At this moment, the rotation cam rotates following this order FIG. 6→FIG. 5→FIG. 4 or FIG. 10→FIG. 9→FIG. 8.

If the rotation cam 12 rotates slightly clockwise from the state of FIG. 6, the control pin 15a is set in a state where the control pin 15a has slightly moved inward the inner peripheral side from the inner peripheral end 12b2 (the terminated rotating position). Therefore, because the rocking member 15 slightly rotates counter-clockwise, the sliding plate 18 moves to the open position of the Y1 direction. At this moment, because the control convex portion 18e of the sliding plate 18 climbs the inclined portion 19f from the concave portion 19e of the door setting portion 19A of the manipulating member 19 and engages the convex portion 19d, the door 100 can be set in the open position, as shown in FIG. 12A.

At the same time, because the sliding pin 93 moves from the state shown in FIG. 10 to the state shown in FIG. 9 inside the small arc shaped groove 12a2, the moving gear 90, the sliding member 80, the moving member 50 and the movable member 60 move in the insertion opening direction (the Y2 direction). At this moment, the draw-in members 70, 70 move in the Y2 direction maintaining the cartridge 2 as well. Therefore, the insertion connector 3 of the cartridge 2 can be detached from the interior connector 40 of the recording medium loading device 10.

Also, if the rotation cam 12 rotates clockwise, the draw-in members 70, 70 maintained by the cartridge 2 moves to the insertion standby position on the insertion portion side of the front side. At this moment, the door 100 is open, so that the rear portion (the Y2 side) of the cartridge 2 can be exposed from the insertion opening 111.

As shown in FIG. 4, if the rotation cam 12 has rotated clockwise to the full extent and the control pin 15a reaches the inner peripheral end 12b2 (terminated rotating position), the sliding plate 18 reaches the fires closed position, whereby the control convex portion 18e reaches the front end of the inclined portion 19g from the convex portion 19d of the door setting portion 19A, as shown in FIG. 12A. As a result, the manipulating member 19 is set in a state which enables the door 100 to be positioned closed by rotating in the α2 direction by the biasing force of the biasing member S4.

Exceptionally, in this state, the cartridge 2 is mounted in the insertion opening 111, the door 100 can be positioned closed because the door 100 is supported by the top face of the cartridge 2.

At this moment, the cartridge 2 moves to the insertion standby position. However, the engaging portion 74 of the draw-in member 70 climbs the inclined portion 32d from the elongated guide hole 32c and reaches the supporting portion 32f as shown in FIG. 13. The engaging portion 74 slips off the concave portion 2d, so that the engagement of the cartridge 2 is released.

In this state, the cartridge 2 is stopped with the rear portion of the cartridge 2 being exposed outside of the device from the insertion opening 111. Therefore, operators can draw the cartridge 2 out by drawing the cartridge 2 out in the Y2 direction with hands.

Further, if the cartridge 2 is drawn out of the device through the insertion opening 111, the manipulating member 19 rotates in the α2 direction by the biasing force of the biasing member S4, whereby the door 100 is set in the closed position where the insertion opening 111 is closed.

As described above, prior to inserting the cartridge 2 in the insertion opening 111, or after mounting the cartridge 2 in the device, or further after drawing the cartridge 2 out of the device through the insertion opening 111, the insertion opening 111 can be closed by positioning the door 100 in the closed position, so that dust is kept from getting into the recording medium loading device 10.

In the recording medium loading device 10, as for the carrying termination state as shown in FIG. 12c, if a new cartridge 2 is inserted into the device through the insertion opening 111, the door 100 is allowed to be positioned open. That is, even though the cartridge 2 has been loaded into the recording medium loading device 10 already, double insertion of the new cartridge 2 can not be prevented.

Therefore, in the embodiment shown in FIG. 15, one side (a side facing the inclined portion 19f) forming the concave portion 19e of the manipulating member 19 is formed as the regulation portion 19h which is substantially perpendicular to the lower portion of the concave portion 19e.

In this way, if the regulation portion 19h is formed in the concave portion 19e of the manipulating member 19, as shown in FIG. 15, the regulation portion 19h abuts the control convex portion 18e of the sliding plate 18 and the manipulating member 19 can be prevented from further rotation in the al direction, even in case that another cartridge 2 is about to be additionally inserted into the device through the insertion opening 111 when the cartridge 2 has been already loaded into the recording medium loading device 10.

Namely, when trying to insert the new cartridge 2 in the device through the insertion opening 111, after the loading of the initial cartridge 2 is completed and the door 100 is closed, the door 100 can not be pressed to be open. Therefore, because the door 100 can be prevented from reaching the open position, the double insertion of the cartridge 2 can be prevented.

Also, in the embodiment, the removable hard disk was used to describe the embodiment of the recording medium having connectors. However, the present invention is not limited to this. For example, the present invention may be applied to a recording medium having IC memory built therein instead of the magnetic disk in the cartridge 2.

What is claimed is:

1. A recording medium loading device comprising:
    an insertion opening for inserting a recording medium provided with an insertion connector;
    a door formed at the insertion opening to be opened and closed;
    an opening and closing device for operating the door to open and close;
    an interior connector for connecting the insertion connector; and
    a loading device for carrying the recording medium in an inserting direction from the insertion opening to a complete loading position where the insertion connector is connected to the interior connector;
    wherein the loading device has a rotation cam which is rotatably formed, the rotation cam being integrally formed with a cam portion which drives the opening and closing device to set a closed position where the door closes the insertion opening and an open position where the door opens the insertion opening, and
    wherein the opening and closing device includes:
        a rocking member being operated by the cam portion;
        a sliding plate moving in response to the rocking movement of the rocking member; and
        a manipulating member rotating in response to the movement of the sliding plate; and
    wherein the door is operated to open and close by the manipulating member.

2. A recording medium loading device according to claim 1, further comprising:
    a first switch member for detecting an initial rotating position of the rotation cam and a second switch member for detecting a terminated rotating position,
    wherein the first switch member and the second switch member are switched by the rocking operation of the rocking member.

3. A recording medium loading device according to claim 1,
    wherein the cam portion is a cam groove formed annularly in the rotation cam, a closing groove portion for positioning the door in the closed position is formed on opposite ends of the cam groove, an opening groove portion for positioning the door in the open position is formed on a part except the opposite ends of the cam groove.

4. A recording medium loading device according to claim 3,
    wherein the rocking member includes a control pin capable of being movable inside the cam groove, the control pin moves between the closing groove portion and the opening groove portion so that the pin is allowed to be rocked.

5. A recording medium loading device according to claim 4,
    wherein the manipulating member is defined with an operation pin, the door is formed with a manipulating groove with a manipulating pin inserted, the control pin moves inside the manipulating groove, when the door is operated to open and close by the rotation of the manipulating member.

6. A recording medium loading device according to claim 1,
    wherein the manipulating member is defined with an operation pin, the door is formed with a manipulating groove with a manipulating pin inserted.

7. A recording medium loading device according to claim 1,
    wherein the manipulating member is defined with a door setting portion including a concave portion and a convex portion, the sliding plate is formed with a control convex portion for locking the concave portion and the convex portion, the sliding plate moves and locks or unlocks the door setting portion, so that the manipulating member is allowed to be rotated.

8. A recording medium loading device according to claim 1,
    wherein the door is set in the closed position, when the recording medium reaches the complete loading position.

9. A recording medium loading device comprising:
    an insertion opening for inserting a recording medium provided with an insertion connector;
    a door formed at the insertion opening to be opened and closed;
    an opening and closing device for operating the door to open and close;
    an interior connector for connecting the insertion connector;
    a loading device for carrying the recording medium in an inserting direction from the insertion opening to a complete loading position where the insertion connector is connected to the interior connector;
    wherein the loading device has a rotation cam which is rotatably formed, the rotation cam being integrally formed with a cam portion which drives the opening and closing device to set a closed position where the door closes the insertion opening and an open position where the door opens the insertion opening, and
    a first switch member for detecting an initial rotating position of the rotation cam and a second switch member for detecting a terminated rotating position, wherein the first switch member and the second switch member are switched by a rocking operation of a rocking member.

* * * * *